(12) United States Patent
Hanaoka et al.

(10) Patent No.: US 7,277,498 B2
(45) Date of Patent: Oct. 2, 2007

(54) MAPPING METHOD OF CODE WORD WITH QAM MODULATION

(75) Inventors: Seishi Hanaoka, Kodaira (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 657 days.

(21) Appl. No.: 10/206,034

(22) Filed: Jul. 29, 2002

(65) Prior Publication Data

US 2003/0156659 A1 Aug. 21, 2003

(30) Foreign Application Priority Data

Feb. 21, 2002 (JP) ............................. 2002-044114

(51) Int. Cl.
*H03K 9/00* (2006.01)
*H04L 27/00* (2006.01)

(52) U.S. Cl. ................... 375/316; 375/340; 375/341; 375/295; 375/224; 375/227; 375/262; 714/786; 714/787; 714/788; 714/765

(58) Field of Classification Search ................ 375/316, 375/340–341, 295, 224, 227, 262; 714/786–788, 714/795

See application file for complete search history.

(56) References Cited

U.S. PATENT DOCUMENTS

| | | | | |
|---|---|---|---|---|
| 3,988,677 | A * | 10/1976 | Fletcher et al. | ............. 714/756 |
| 5,023,889 | A * | 6/1991 | Divsalar et al. | ............. 375/244 |
| 5,103,459 | A * | 4/1992 | Gilhousen et al. | .......... 370/206 |
| 5,164,963 | A | 11/1992 | Lawrence et al. | |
| 5,691,995 | A | 11/1997 | Ikeda et al. | |
| 5,812,601 | A * | 9/1998 | Schramm | .................... 375/262 |
| 6,088,387 | A * | 7/2000 | Gelblum et al. | ............ 375/222 |
| 6,546,509 | B2 * | 4/2003 | Starr | .......................... 714/704 |
| 6,553,145 | B1 | 4/2003 | Kang et al. | |

FOREIGN PATENT DOCUMENTS

| | | |
|---|---|---|
| EP | 1 043 858 A1 | 10/2000 |
| JP | 04-313983 | 11/1992 |
| JP | 07-283740 | 10/1995 |
| JP | 09-023212 | 1/1997 |
| JP | 2000-165865 | 6/2000 |
| JP | 2000-201132 | 7/2000 |

OTHER PUBLICATIONS

John Proakis, Digital Communications (4th edition); McGraw-Hill Book Company, 2001 (Fig. 8.1-19, p. 468).*
Jerry D. Gibson, The Communication Handbook; CRC Press LLC, 1997 (Fig. 19.3, p. 247).*
Michel C. Jeruchim et al., Simulation of Communications Systems: modeling, methodology, and techniques; Kluwer Academic / Plenum Publishers, 2000 (Fig. 12.17, p. 795).*
Lei, S.W.; Lau, V.K.N.; "Adaptive interleaving for OFDM in TDD systems", IEE Proc. Commun. vol. 148, No. 2, Apr. 2001, pp. 77-80.*

* cited by examiner

*Primary Examiner*—David C. Payne
*Assistant Examiner*—Nader Bolourchi
(74) *Attorney, Agent, or Firm*—Mattingly, Stanger, Malur & Brundidge, P.C.

(57) ABSTRACT

In the code word mapping operation of a radio communication system, mapping patterns are provided for different S/N ratios, the code word bits produced from a coder are not equally assigned to multi-level modulation bits, but weighted according to the resistance of multi-level modulation bits to error before being assigned, and the mapping patterns are switched in accordance with S/N. Since the code word mapping method is updated so that the error rate can be always minimized according to the situations of a propagation path and S/N ratio, communication can be made with high communication quality.

6 Claims, 22 Drawing Sheets

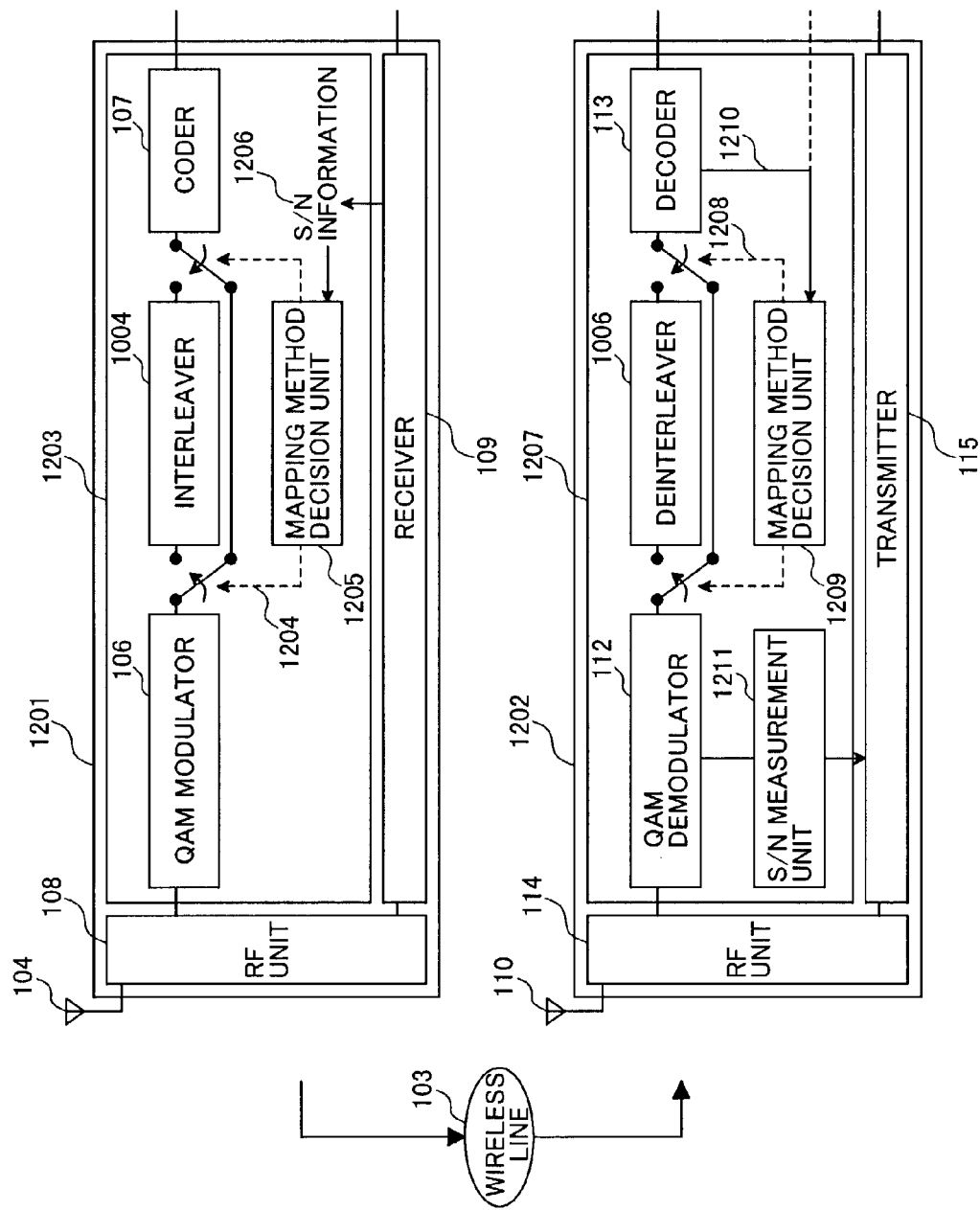

FIG.19
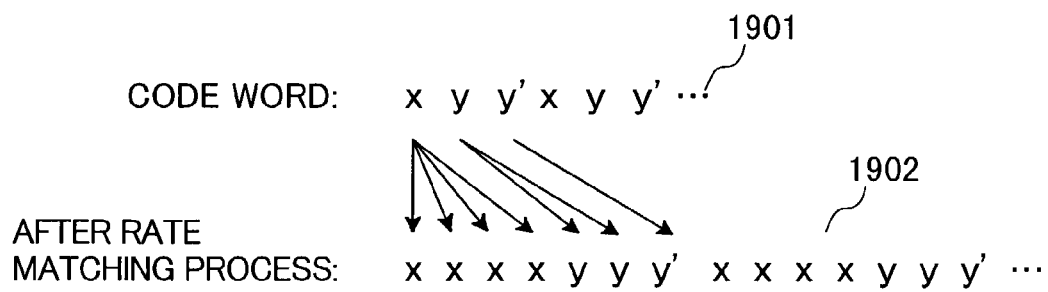
CODE WORD: x y y' x y y' ... 1901
AFTER RATE MATCHING PROCESS: x x x x y y y' x x x x y y y' ... 1902
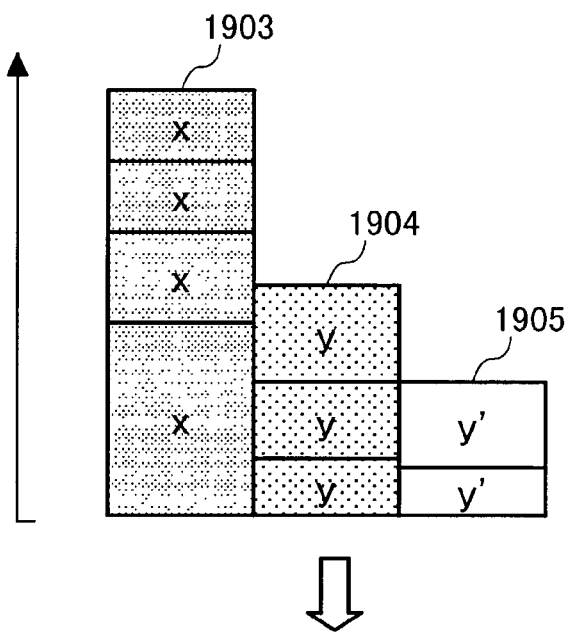
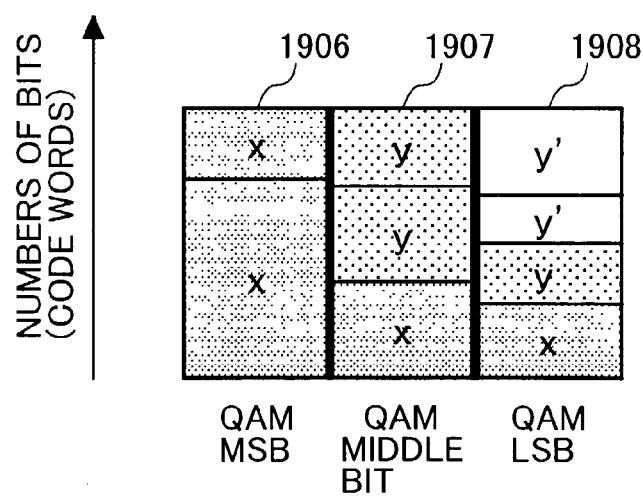
QAM MSB    QAM MIDDLE BIT    QAM LSB

MAPPING METHOD OF CODE WORD WITH QAM MODULATION

BACKGROUND OF THE INVENTION

The present invention generally relates to a communication system, and particularly to a mapping method of code word in radio communication apparatus used in a radio communication system.

FIG. 1 is a block diagram of the constructions of conventional radio communication apparatus and radio communication system. The radio communication system is formed of a transmission-side radio communication apparatus 101 and a receiving-side radio communication apparatus 102 between which messages and data are transmitted through a radio propagation path 103. Although in FIG. 1 and all the following drawings one channel (for example, downlink) is given as an example, the same is true of uplink.

In the transmission-side radio communication apparatus 101, the data to be transmitted is first encoded by a coder 107 within a transmitter 105. In radio communication, convolutional coding and turbo coding are often used as coding methods. The coded words, or code words are supplied to and modulated by a QAM (Quadrature Amplitude Modulation) modulator 106. The modulated baseband signal after the modulation is converted to a radio frequency band by an RF unit 108, and then transmitted. On the receiving-side radio communication apparatus 102, the radio signal received from the radio propagation path 103 via an antenna 110 is converted to the baseband signal by an RF unit 114. The baseband signal is first demodulated by a QAM demodulator 112 of a receiver 111, and then decoded by a decoder 113.

It is here assumed that the coder in the transmission-side apparatus makes turbo coding of a coding rate of R=⅓ and constraint length K=4.

FIG. 2 shows an example of the construction of a turbo encoder that makes turbo coding of a coding rate of R=⅓ and constraint length K=4. This coding is one of the widely used coding methods as stipulated by 3GPP (3$^{rd}$ Generation Partnership Project) specification TS25.212 for the third generation mobile communication. This turbo encoder is formed of two convolution coders and an interleaver provided within the turbo encoder. When a one-bit input 201 is applied to that encoder, three bits 203, 204, 205 are produced from the output. Particularly, it is characterized that output bit 203 is produced as the input bit itself. For the sake of convenience, the output bit produced as the input bit is called x-bit, the convolution-coded output called y-bit, and the output bit convolution-coded after interleaving within the turbo encoder called y'-bit.

The QAM modulator 106 in the transmission-side apparatus 101 makes QAM that has been investigated from old times in order to increase the transmission efficiency.

The error rate in the conventional demodulation and modulation will be mentioned below.

FIG. 3 shows the arrangement of signal points for multilevel modulation of 64 QAM in the transmission-side QAM modulator 106. In 64 QAM, 6 bits per symbol can be transmitted. As shown in FIG. 3 (by 301), 6 bits {S5, S4, S3, S2, S1, S0} of each symbol are grouped into three in-phase component bits {S2, S1, S0} and three quadrature component bits {S5, S4, S3}, and the symbols are subjected to gray coding in order that the adjacent symbols have one-bit difference, arranged at the signal points as shown in FIG. 3, and transmitted.

The QAM demodulator 112 of the receiver 111 in the receiving-side apparatus 102 makes demodulation of the received signals according to their receiving points. FIG. 4 shows a demodulating method in which hard decision is made of whether the transmitted signal is "0" or "1" depending on the position of received signal. The S5-bit assigned to the most significant bit of, for example, quadrature component {S5, S4, S3} is decided "0" if the quadrature component of the received signal is positive, or "1" if it is negative as shown in FIG. 4 (at 405). If, for example, "0" is transmitted as information, and noise is added to the received signal, then error occurs when the value of the quadrature component becomes negative across the decision threshold, received signal amplitude (=0). Therefore, the more distant the received signal from the decision threshold, the more unlikely it is that error occurs, that is, the resistance to noise is strong.

From the observation of demodulation (405) of S5-bit and demodulation (402) of S2-bit, it will be understood that the threshold for decision is the same received signal level (amplitude)=0 except that the axes to be noted are different. In other words, the resistance (communication quality) of S5-bit to noise can be considered to be the same as that of S2-bit.

In addition, from the demodulation (405) of S5-bit and demodulation (403) of S3-bit, it will be seen that since the threshold for decision of "0", "1" often occurs for S3-bit, the resistance (communication quality) of S3-bit to noise is weak.

These values will be quantitatively evaluated. FIG. 5 shows the error rate characteristic of each of 6 bits that can be transmitted per symbol of 64 QAM. From the comparison of necessary S/N (ratio of signal power to noise power) for error rate =$10^{-1}$ in FIG. 5, it will be seen that the medium bit {S4, S1} is about 12 dB necessary which is 6 dB larger than the most significant bit {S5, S2} of 6 dB that has strong resistance to error, and which is 3 dB less than the least significant bit {S3, S0} of about 15 dB that has weak resistance to error.

Although the above description was made for hard decision, the demodulated data from the QAM demodulator 112 has a likelihood (probability) provided by soft decision because data is decoded by the decoder 113 after demodulation by the QAM demodulator 112 of receiver 111 in the receiving-side apparatus 102.

This radio communication system considers the mapping of turbo-encoded code word bits to bits of the 64 QAM symbol. As illustrated in FIG. 6, when a code word sequence 601 is mapped into bits (602) of QAM, the x-bit (603) of the code word is produced at every third bit because of coding rate R=⅓. In addition, this x-bit is every time mapped into S5-bit or S2-bit that is the strongest to error in 64 QAM but never mapped into other bits (701). FIG. 7 shows the code word mapping of a fixed mapping method. FIG. 8 shows an error rate characteristic of the fixed mapping method. This mapping method (here called fixed mapping) can be used for y-bit or y'-bit of other code words. For example, y-bits are all assigned to the medium bit {S4, S1} of 64 QAM (702), and y'-bits every time to the S2-bit, S0-bit of 64 QAM that is the lowest resistance to error (703). Therefore, the conventional radio communication apparatus constructed by the combination of 64 QAM and turbo coding of cording rate R=⅓ cannot attain a steep error characteristic irrespective of using the turbo coding shown in FIG. 8.

This error rate deterioration is caused by the fixed mapping shown in FIG. 7. The method for overcoming this problem is to interleave. The interleaving is the technique for previously changing the order of bits of a bit sequence to be transmitted in order to strengthen the resistance to burst error that occurs particularly in radio communication.

FIG. 9 shows the situation in which bits of each turbo code word are mapped into bits of 64 QAM at the time of interleaving. That is, each code word is equally mapped into bits from the most significant bit to the least significant bit of QAM (901, 902, 903).

FIG. 10 is a block diagram showing the construction of a radio communication system with an interleaver added. A transmitter 1003 of a transmission-side radio communication apparatus 1001 makes turbo coding by the coder 107, makes interleaving (1004), and then makes QAM modulation (106) by mapping into QAM bits. A receiver 1005 of a receiving-side apparatus 1002 makes QAM demodulation (112), deinterleaving (1006) for restoring the interleaved sequence to the original one, and then decoding of turbo code by the decoder 113. FIG. 11 is a graph of error rate characteristic with this interleaver added. The interleaving process can cause the error rate characteristic to have steepness peculiar to the turbo code in the high S/N region. In the low S/N region, however, the interleaving deteriorates the error rate characteristic.

Thus, after detailed examination of the error rate characteristics in the prior art, the following problems have been found.

In the conventional radio communication system, since the fixed mapping method with no interleaver is used in which each code word bits are every time assigned to the same bits of QAM, the communication quality of each code word is changed, thus causing the error rate characteristic deterioration shown in FIG. 8.

Also, in the conventional system, when the bits of code words are equally assigned to QAM bits by adding an interleaver, the error rate can be improved in the high S/N region so that a steep error rate characteristic peculiar to turbo code can be obtained, but contrarily in the low S/N region the error rate characteristic is deteriorated by the interleaving as shown in FIG. 11.

In addition, the conventional system has the drawback that the code word mapping method cannot be changed according to the situation of propagation path and S/N.

Moreover, in the conventional system, the code word mapping method does not consider the level of importance of code word for decoding and the resistance of QAM bits to error, and thus satisfactory error rate characteristics cannot be achieved in all S/N regions.

SUMMARY OF THE INVENTION

In order to solve the above problems, it is an object of the invention of this application to provide a communication method using a multi-level modulation system, having the steps of, on a transmission side, coding M-bit data into N-bit data (where $M \leq N$), selectively rearranging (interleaving) the N-bit data, and modulating the N-bit data into symbols of a plurality of bits each before transmitting, and on a receiving side, demodulating the received symbols into the N-bit data, selectively rearranging (deinterleaving) the N-bit data, and decoding the demodulated N-bit data into the M-bit data.

In other words, the fixed mapping and interleaving are selectively used considering the graph shown in FIG. 13. When the S/N of the transmission path varies within a certain range, it is possible not to select the presence/absence of interleaving operation. The transmission-side apparatus of the invention is constructed to have a coder for converting M-bit data into N-bit data (where $M \leq N$), an interleaver for rearranging (interleaving) the N-bit data produced from the coder, a multi-level modulator for converting the N-bit data into symbols of a multi-level each, and a controller for switching the presence/absence of rearranging the N-bit data. The receiving-side apparatus is constructed to have a demodulator for demodulating the received symbols of a multi-level each into the N-bit data, a deinterleaver for rearranging (deinterleaving) the N-bit data, a decoder for converting the N-bit data into the M-bit data (where $M \leq N$), and a controller for switching the presence/absence of rearranging the N-bit data. A system produced by the combination of these apparatus can be considered to be within the scope of the invention.

It is another object of the invention to provide a communication method using a multi-level modulation system, having the steps of, on a transmission side, coding M-bit data into N-bit data (where $M \leq N$), and converting the N-bit data into symbols of a plurality of bits each or making multi-level modulation, and on a receiving side, demodulating the symbols into the N-bit data, and decoding the N-bit data into the M-bit data. Each bit of the N-bit data is weighted (or has a level of importance at the time of decoding). For example, each bit of the code word shown in FIG. 6 is weighted. In addition, each of the symbol has a different resistance to error. For example, each point shown in FIG. 3 has a different resistance to error. This difference is shown in FIG. 5. Therefore, according to this aspect, when conversion is made between the N-bit data and the symbols as in the transmission side and receiving side, the mth bit A of the N-bit data is made corresponding to symbol α, and the nth bit B to symbol β, so that a bit having a relatively large weight can be made corresponding to a symbol having a relatively high resistance to error. The effect of the invention can be achieved by satisfying the above conditions in at least a pair of bit A and bit B. Specifically, bits having large weights are preferentially assigned to symbols having high resistance to error. As another example, when conversion is made between the N-bit data and the symbols on the transmission side and the receiving side, a rule is used to execute that large-weight bits of all bits of the N-bit data, but not only bits A and B, are assigned to symbols of high resistance to error. Other specific examples will be explained in the sections of the embodiments of the invention. These conversion rules may be provided as mapping tables, and selected according to the quality of the propagation path between the transmission side and the receiving side. The quality of the propagation path can be acquired by measuring the S/N ratio (ratio of signal power to noise power).

The conversion between the N-bit data and the symbols according to the mapping tables can be achieved by interleave patterns of definite length. As another modification, when the quality of the propagation path between the transmission side and the receiving side is less than a predetermined value, the above rule is used, while when the quality of the propagation path between the transmission side and the receiving side is larger than the predetermined value, the respective bits of the N-bit data may be equally or randomly assigned to the symbols of the range from high resistance to low resistance to error.

When the mapping tables are generated, use of waterpouring theorem will lead to good results.

The transmission-side apparatus of a communication system using a multi-level modulation system according to the invention has a coder for converting M-bit data into N-bit data (where $M \leq N$), a multi-level modulator for converting the N-bit data into symbols of a multi-level each, and a mapping method decision unit for controlling a rule of conversion between the N-bit data and the symbols in the multi-level modulator, wherein in this conversion rule the respective bits of the N-bit data are not equally or randomly assigned to the symbols, but assigned after being weighted according to the resistance-to-error of each symbol. The receiving-side apparatus of the communication system using the multi-level modulation system has a demodulator for demodulating the received symbols of the multi-level each into the N-bit data, a decoder for converting the N-bit data into the M-bit data (where M≦N), and a mapping method decision unit for controlling the conversion rule of conversion between the N-bit data and the symbols in the demodulator on the basis of the mapping rule set on the transmission side. At this time, before receiving the symbols, ID information for identifying the mapping rule is previously received, and mapping tables are provided according to the ID information. Thus, the present invention, when the S/N is in a low region, makes code word mapping without interleaving, and when the S/N is in a high region, makes code word mapping after interleaving.

In addition, the transmission-side apparatus and receiving-side apparatus calculate the S/N ratio, and make mapping processing according to the code word mapping method in which the error rate is minimized according to the S/N.

Also, the transmission-side apparatus and receiving-side apparatus calculate the S/N ratio, and make mapping processing on a bit sequence that was subjected to bit repetition and puncture in response to the level of importance for decoding of code word so that the mapping processing can be made by the code word mapping method in which the error rate is minimized according to the S/N ratio.

Specific constructions of the invention will be given as follows.

(1) A mapping method for use in a radio communication system formed of a transmission-side radio communication apparatus and a receiving-side radio communication apparatus, the transmission-side apparatus including an coder for redundantly increasing bit number by one to produce multi-bit data in order to raise the resistance to error in a radio propagation path, an interleaver for rearranging (interleaving) the data produced from the coder, a multi-level modulator for mapping a plurality of bits to one symbol to make multi-level modulation, and a control mechanism for switching the presence/absence of the interleaver's operation, and the receiving-side apparatus including a demodulator for demodulating the received signal, a deinterleaver for rearranging (deinterleaving) the demodulated data, a decoder for decoding input data after the demodulation, and a control mechanism for switching the presence/absence of the deinterleaver's operation, wherein a mapping method for the mapping the output from the coder to the multi-level modulation bits is executed so that when the S/N ratio (ratio of signal power to noise power) of the radio propagation path is lower than a reference value, the transmission-side apparatus and receiving-side apparatus do not make interleaving and deinterleaving, respectively, and when the S/N ratio is higher than the reference value the transmission-side apparatus and receiving-side apparatus make interleaving and deinterleaving, respectively.

(2) A mapping method according to the method (1), wherein the situation of the radio propagation path is decided from the measured S/N ratio, and the switching of the presence/absence of the interleaver's operation is not made when the S/N ratio varies within a certain range so that the current communication is continued under the mapping method so far used, thus reducing the frequency of the switching for the presence/absence of the interleaver's operation.

(3) A mapping method for use in a radio communication system formed of a transmission-side radio communication apparatus and a receiving-side radio communication apparatus, the transmission-side apparatus including a coder for redundantly increasing bit number by one to produce multi-bit data in order to raise the resistance to error in a radio propagation path, a mapping method decision unit for controlling a method for mapping the data from the coder to multi-level modulation bits, a mapper for mapping the output from the coder to multi-level modulation bits by a mapping method specified by the mapping method decision unit, and a multi-level modulator for making multi-level modulation with different communication quality for each bit in order that a plurality of bits can be transmitted on one symbol, and the receiving-side apparatus including a demodulator for demodulating the received signal, a mapping method decision unit for deciding which mapping method was used in the transmission-side apparatus from the arrangement of the demodulated data, a demapper for demapping the mapping made by the mapping method ordered by the mapping method decision unit of the transmission-side apparatus, a decoder for decoding the demodulated data after the demapping, wherein a mapping method for the mapping of code word to multi-level modulation bits in the transmission-side apparatus and receiving-side apparatus is executed so that the code word from the coder is assigned to multi-level modulation bits after being weighted according to the communication quality (resistance to noise error) of the multi-level modulation bits, but not equally assigned.

(4) A mapping method according to the method (3), wherein the mapping method decision unit previously provides mapping patterns or mapping tables for different S/N ratios in which the error rate can be minimized, and those mapping patterns are switched according to the S/N ratio (ratio of signal power to noise power) of the radio propagation path to make mapping of the output from the coder into multi-level modulation bits, so that the mapping operation can be made at the minimum error rate for all S/N ratios, and the mapping patterns for reducing the error rate to the minimum are respectively provided for different S/N ratios and switched according to the S/N ratio, in such a manner that the code word from the coder is assigned after being weighted according to the resistance of multi-level modulation bits to error, but not equally assigned to multi-level modulation bits.

(5) A mapping method according to the method (3) or (4), wherein the mapping patterns for reducing the error rate to the minimum are provided as interleaving patterns of a finite length by an interleaver in place of the mapper in the transmission-side apparatus, and by a deinterleaver in place of the demapper in the receiving-side apparatus.

(6) A mapping method according to any one of methods (3)-(5), wherein the weighting of the code word from the coder to multi-level modulation bits is made so that when the S/N ratio is low, the code word having high levels of importance for decoding of code word is assigned to multi-level modulation bits that have strong resistance to noise error, and when the S/N ratio is high the code word is equally assigned to multi-level modulation bits having strong and weak resistance-to-error bits.

(7) A mapping method according to any one of the methods (3)-(6), wherein the transmission-side apparatus has a rate matching unit provided between the coder and the mapper to make repetition and puncture of code word, the receiving-side apparatus has a rate dematching unit provided between the demapper and the decoder to restore the repetition and puncture of code word made in the transmission-side apparatus, and the transmission-side apparatus makes repetition of code word at a repetition rate (bit number after repetition/bit number before repetition) that changes according to the level of importance for decoding of the code word produced from the coder, and most suitably assigns the bits of each code word in order that the necessary transmission power for a certain error rate can be reduced to the minimum, thereafter mapping to multi-level modulation bits.

(8) A mapping method according to the method (7), wherein the transmission-side apparatus has a rate matching unit provided between the coder and the mapper to make repetition and puncture of code word, the receiving-side apparatus has a rate dematching unit provided to restore the repetition and puncture of code word made in the transmission-side apparatus, and the transmission-side apparatus makes repetition of code word at a repetition rate that changes according to the level of importance for decoding of the code word from the coder, most suitably assigns the energy of each of the bits of each code word in order that the necessary transmission power for a certain error rate can be reduced to the minimum, and makes weight-mapping according to the communication quality (resistance to noise error) of each of the multi-level modulation bits as described in mapping methods (3)-(6).

(9) A mapping method according to any one of methods (3)-(8), wherein when mapping tables are generated for the mapping of code words to multi-level modulation bits, water-pouring theorem is used for the optimum mapping tables.

(10) A mapping method according to any one of methods (1)-(9), wherein the receiving-side apparatus measures the S/N ratio of the radio propagation path from the received signal and modulated signal, and transmits the results or the difference information to the previously measured S/N ratio via another channel that is different from the channel through which the signal from the transmission-side apparatus was received, and the transmission-side apparatus switches the weight-mapping methods of code word on the basis of the S/N information received through the other channel.

(11) A mapping method according to any one of methods (1)-(10), wherein the transmission-side apparatus first transmits ID information for mapping methods before sending a message (information), and the receiving-side apparatus receives this ID information, demodulates or decodes it, and orders its mapping decision unit to provide a mapping table according to the ID information before receiving the message (information) from the transmission-side apparatus.

(12) A mapping method according to any one of methods (1)-(11), wherein the frequency at which the mapping methods are switched in accordance with the S/N ratio of the radio propagation path depends on the system used in the transmission-side apparatus and the receiving-side apparatus, but the switching is made at the minimum coding unit that can be transmitted, or at each frame unit of about 10 ms.

(13) A mapping method according to any one of methods (1)-(12), wherein this mapping method is used for a cellular phone system.

(14) A mapping method according to any one of methods (1)-(12), wherein this mapping method is used for a radio LAN system.

(15) A mapping method for use in a radio communication system that is formed of a transmission-side apparatus and a receiving-side apparatus, wherein these apparatus have a plurality of different interleave patterns or mapping patterns for mapping code words to multi-level modulation bits, and switch the interleave patterns or mapping patterns without changing the transmission speed according the variation of the propagation path while making communication with each other at a constant transmission speed.

Other objects, features and advantages of the invention will become apparent from the following description of the embodiments of the invention taken in conjunction with the accompanying drawings.

BRIEF DESCRIPTION OF THE DRAWINGS

FIG. 12 is a block diagram of a radio communication system of the invention.

FIG. 19 is a conceptual diagram showing the state of cord word mapping according to the invention.

DESCRIPTION OF THE EMBODIMENTS

The first embodiment of the invention will be described.

FIG. 12 is a block diagram showing the construction of a radio communication system according to the invention. In a transmission-side radio communication apparatus 1201, unlike the conventional one, the receiver 109 receives S/N information 1206 from the current propagation path, and there are also provided a mapping method decision unit 1205 for decision of a mapping method according to this value, and a switch 1204 for switching an interleaver 1004 and its bypass. In addition, in a receiving-side radio communication apparatus 1202, a mapping method decision unit 1209 and switch 1208 are provided for switching mapping method in synchronism with the S/N information 1210 used in the transmission-side apparatus.

In this system, the transmission-side apparatus 1201, when the S/N is in a low region, does not make interleaving, but maps the code word into QAM bits without interleaving, and when the S/N is in a high region, it makes interleaving (1004) after encoding by the coder 107 and maps the interleaved code word into QAM bits, thus making QAM modulation. The receiving-side apparatus 1202, when the S/N is in a low region, supplies the code word after QAM demodulation directly to the decoder 113 without interleaving, and when the S/N is in a high region, it interleaves (1006) the demodulated data, and then supplies it to the decoder 113.

Figure 13:
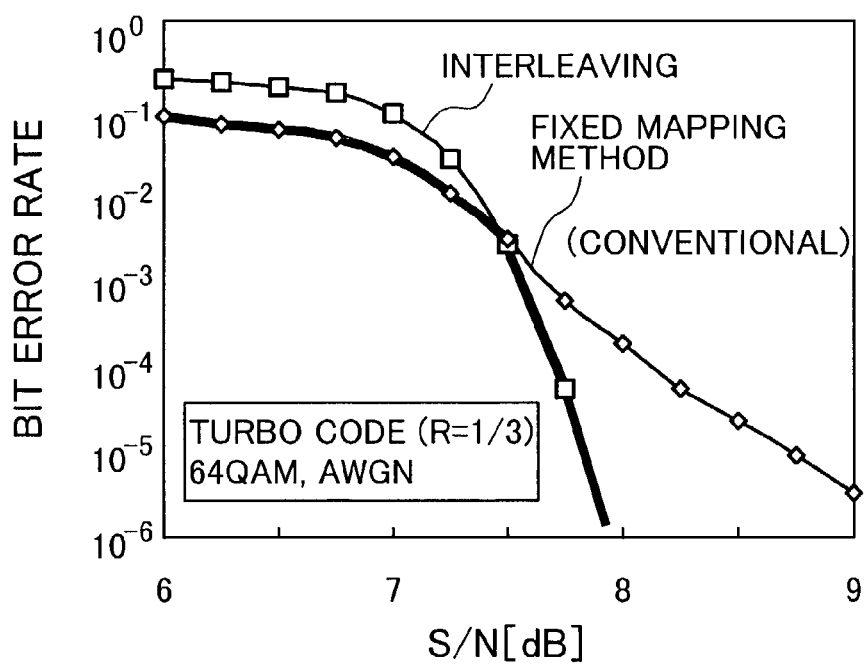
FIG. 13 is a graph of error rate characteristics according to the invention.

When a turbo code of, for example, coding rate R=⅓ and 64 QAM are used as a coding method, the interleaving process is not made when the S/N is smaller than 7.5 dB, but is performed by switching when the S/N is larger than 7.5 dB as illustrated in FIG. 13, so that the operation can be made at a satisfactory error rate even if the S/N is in any region as shown in FIG. 13 by the bold line. This embodiment can be applied not only to the example of FIG. 13, but also to any combination of other coding methods, other coding rates and other multi-level QAM. The S/N measuring method in the receiving-side apparatus and the S/N information acquisition method in the transmitting-side apparatus will be described in detail in the tenth embodiment section given later.

The second embodiment of the invention will be described next.

Figure 21:
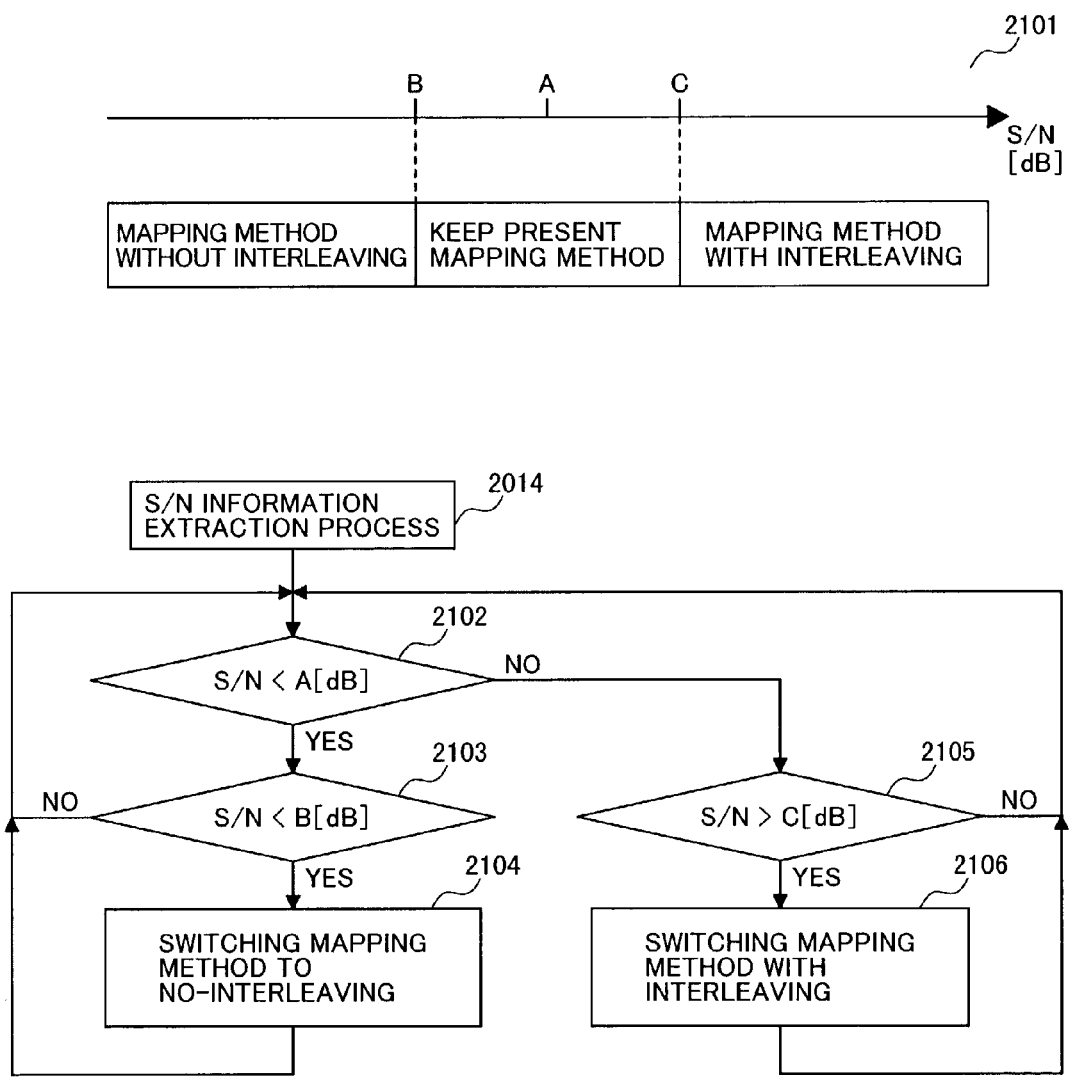
FIG. 21 is a flowchart of the processing in a mapping method decision unit.

FIG. 21 is a flowchart for the process in the mapping decision unit.

This embodiment considers the case where the transmission-side apparatus and receiving-side apparatus in FIG. 13 of the first embodiment are placed under the closed-loop transmission power control so that the power is controlled constant at around S/N=7.5 dB or that the situation of the radio propagation path is substantially kept constant around S/N=7.5 dB. In this case, in the first embodiment, since the interleaving operation is switched on or off, or present or absent according to the reference value of S/N=7.5 dB, the frequency of the switching for interleaving inevitably increases. However, when the S/N is around 7.5 dB, there is almost no error rate characteristic difference between the interleaving operation and not interleaving operation as will be apparent from FIG. 13. Therefore, an S/N interval of no switching control is provided as shown in FIG. 21.

Specifically, the switching point S/N=7.5 dB for interleaving operation in FIG. 13 is used as a reference value, and a value B dB lower than the reference value and a value C dB higher than the reference value are provided. When the S/N is between B and C, the current communicating operation (with interleaving or without interleaving) is continued. When the current S/N is lower than B dB, switching control is made not to interleave (2104), and when the S/N is higher than C dB, switching control is made to interleave (2106). By this control, it is possible to reduce the frequency of the switching for the interleaving operation without deteriorating the error rate characteristic, and thus to simplify the signal processing in both the transmission-side apparatus and the receiving-side apparatus.

The third embodiment of the invention will be described.

Figure 5:
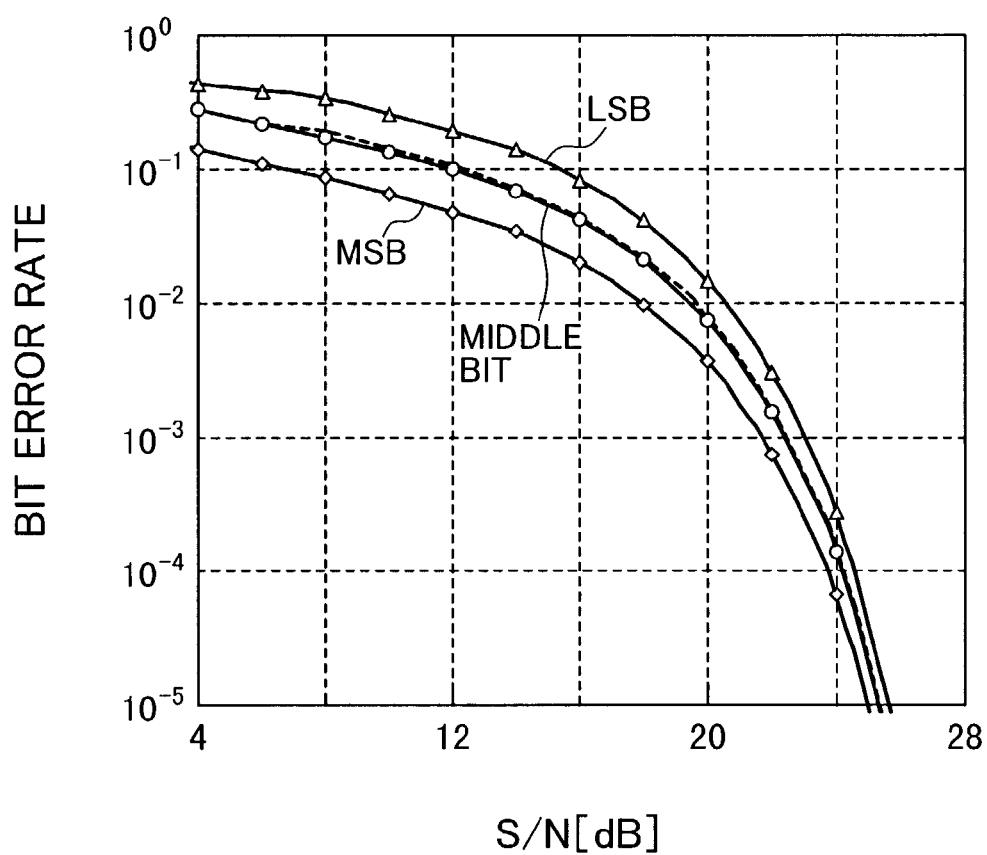
FIG. 5 is a graph of 64 QAM error rate.
Figure 6:
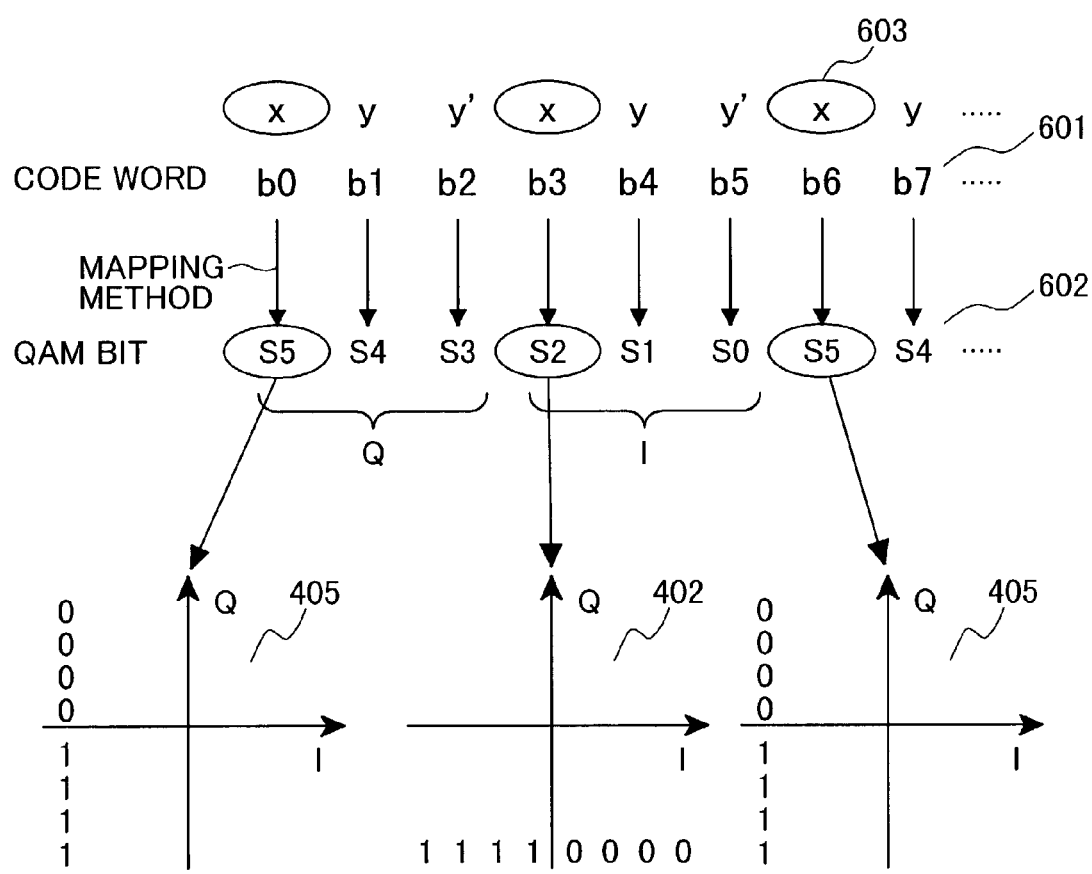
FIG. 6 is a conceptual diagram of a code word mapping method.
Figure 7:
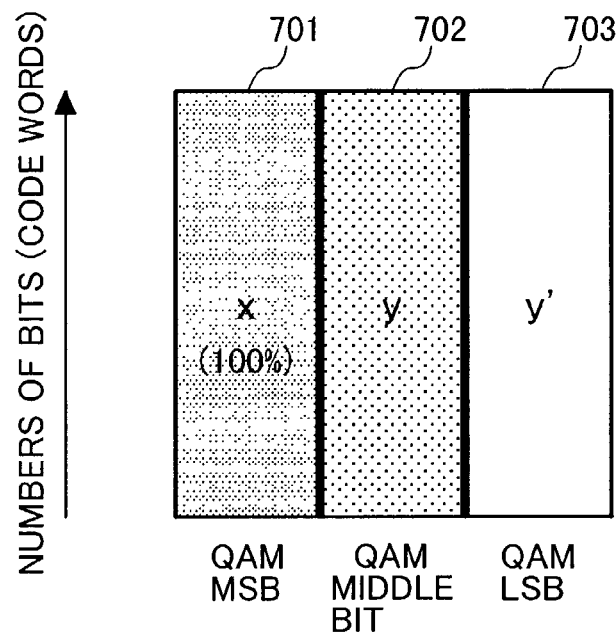
FIG. 7 is a conceptual diagram showing the state of code word mapping in a fixed mapping method.
Figure 8:
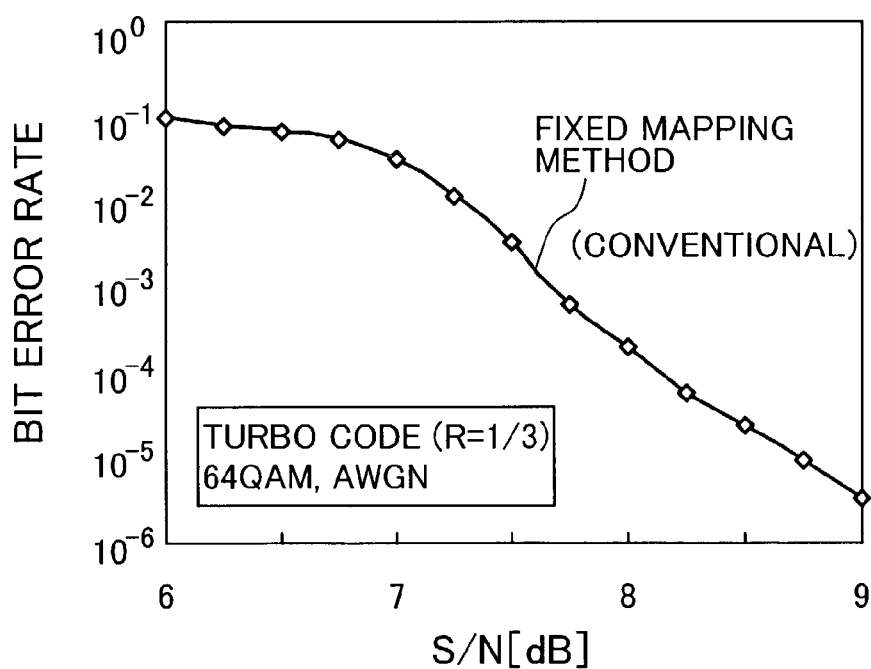
FIG. 8 is a graph of an error rate characteristic in a fixed mapping method.
Figure 9:
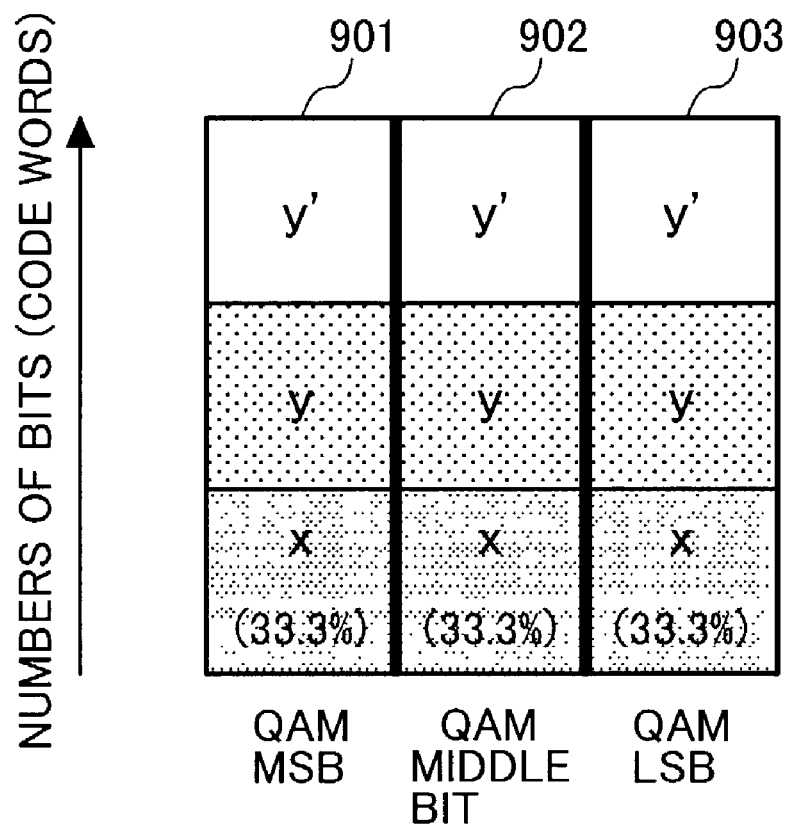
FIG. 9 is a conceptual diagram showing the state of code word mapping at the time of interleaving.
Figure 10:
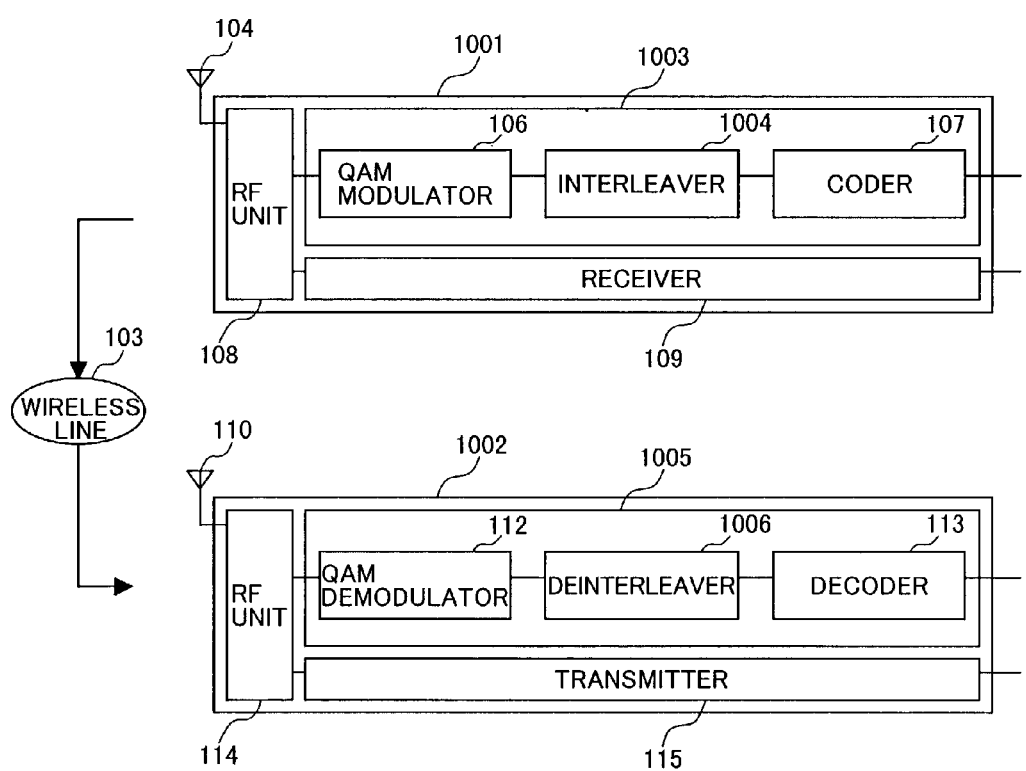
FIG. 10 is a block diagram of a conventional radio communication system.
Figure 11:
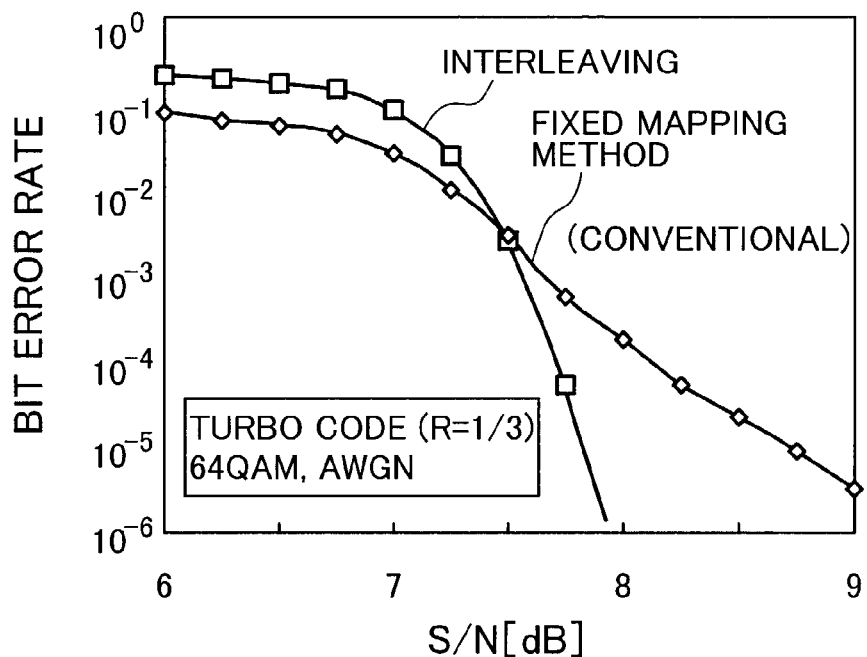
FIG. 11 is a graph of error rate characteristics at the time of interleaving.
Figure 16:
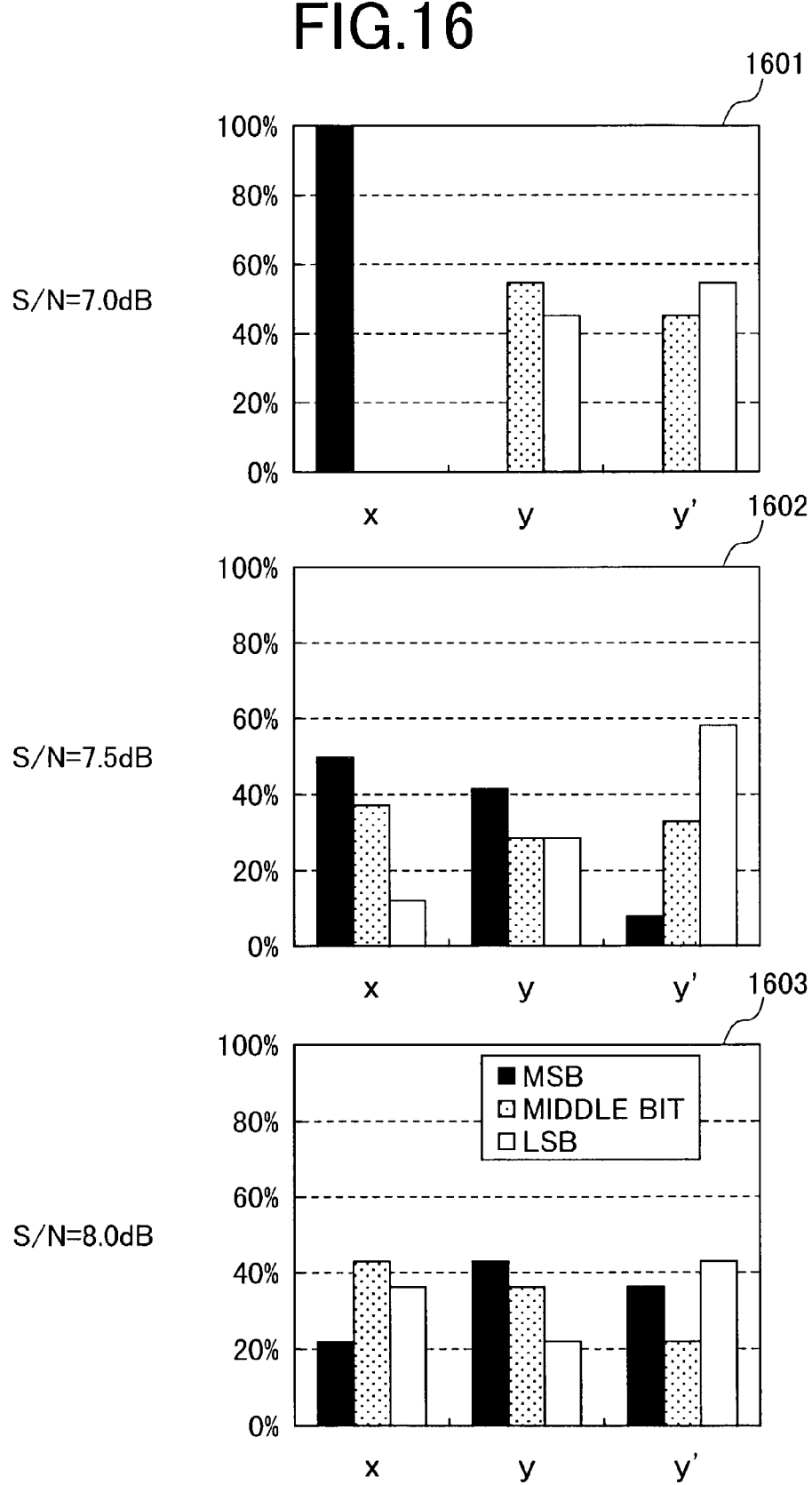
FIG. 16 is a graph showing an example of mapping table according to the invention.
Figure 17:
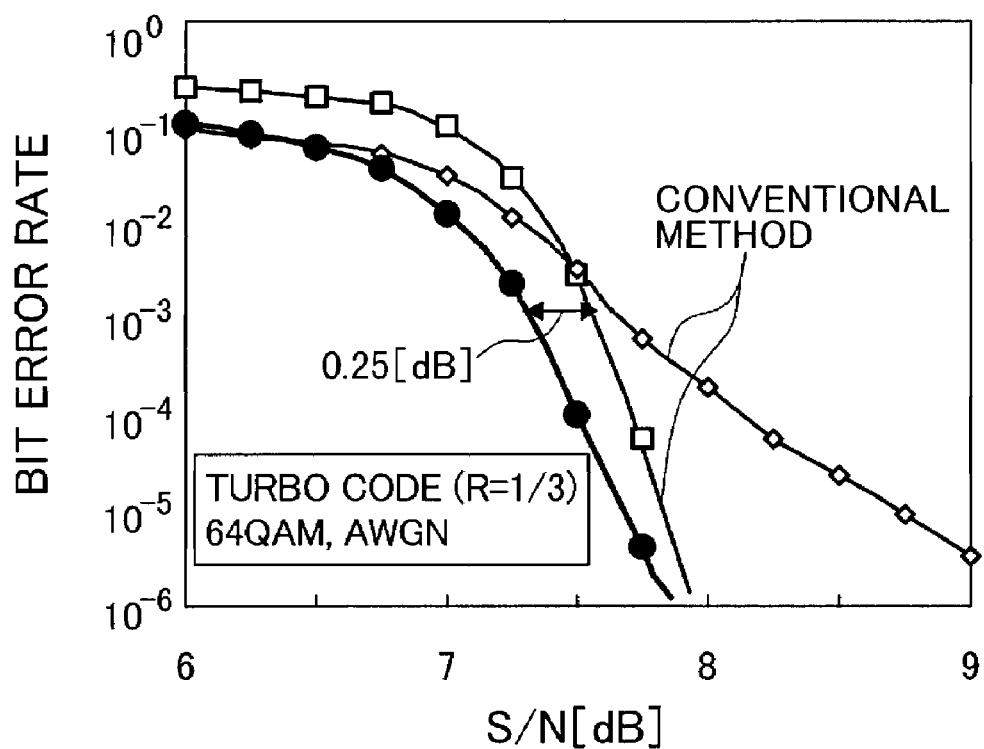
FIG. 17 is a graph of error rate characteristic according to a weighted mapping method.

This embodiment directs its attention to the fact that the error rate characteristic is changed as in FIG. 11 by changing the code word mapping method as in FIG. 7 or FIG. 9, and further tries to reduce the error rate by changing the rate at which each code word is assigned to QAM bits. Referring back to the error rate of each bit of 64 QAM in FIG. 5, it will be seen that when the average S/N is in a low region, the difference between the resistance of the most significant bit to error and the resistance of the least significant bit to error is large (example: when the average S/N=12 dB, the difference between the resistance of the most significant bit and that of the least significant bit to error is about 9 dB), but when the average S/N is in a high region, the difference between the resistance of the most significant bit and that of the least significant bit to resistance is small (example: when the average S/N=20 dB, the difference between the most significant bit and that of the least significant bit is about 2 dB). Thus, since the resistance of bit to error is changed with the change of S/N, the rate at which each code word is assigned to QAM bits in order to reduce the error rate to the minimum can be considered to change. Thus, the mapping rate at which the error rate becomes the minimum at S/N=7.0 dB, 7.5 dB and 8.0 dB is evaluated by computer simulation. FIG. 16 shows the results. At S/N=7.0 dB, when the x-bit of code word is assigned at a rate of 10% to the most significant bit {S5, S2} of 64 QAM, and when the y-bit and y'-bit are substantially equally assigned to the medium bit and the least significant bit of 64 QAM, respectively, the error rate becomes the minimum (1601). At S/N=8.0 dB, when each code word is substantially equally assigned to each bit of 64 QAM, the error rate becomes the minimum. FIG. 17 is a graph showing error rate characteristics with the code word mapping method being changed so that the error rate becomes the minimum according to S/N. From FIG. 17, it will be understood that this embodiment can further improve the error rate characteristic as compared with the conventional one.

Figure 14:
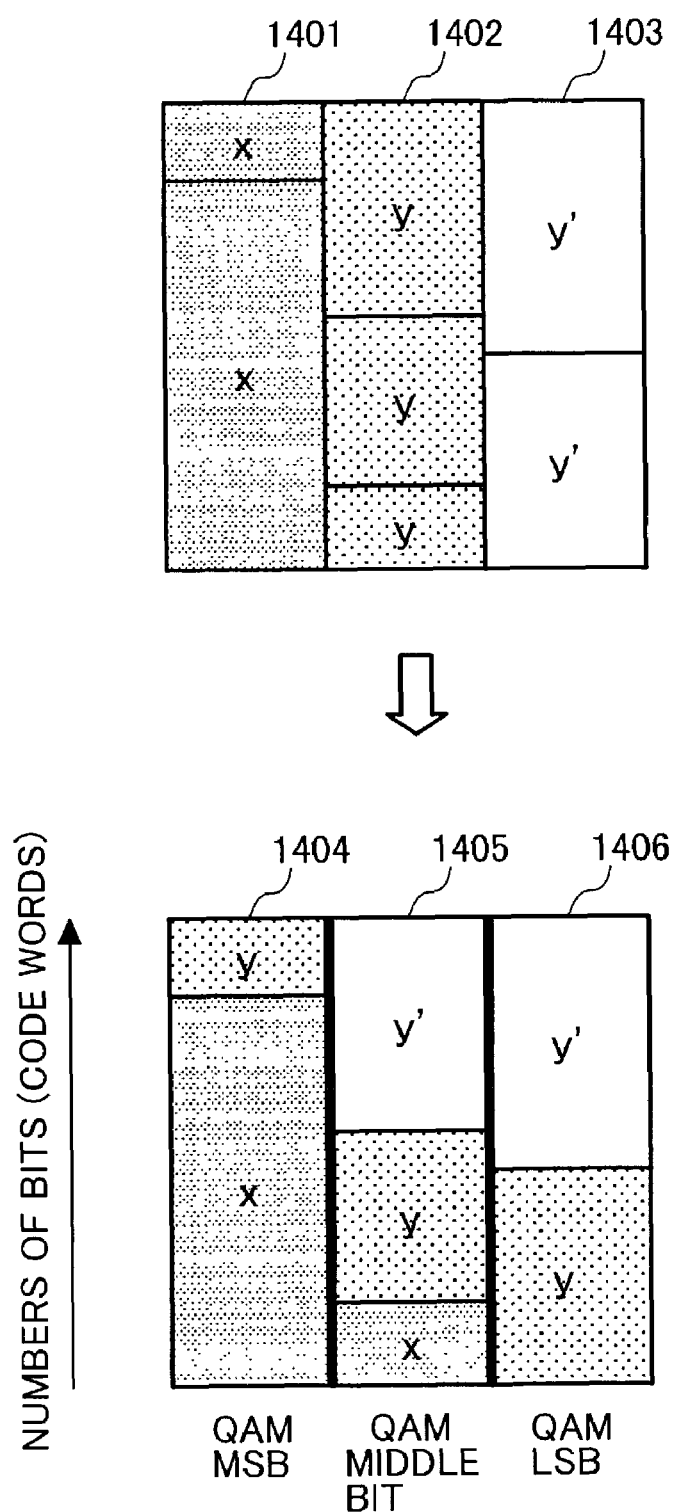
FIG. 14 is a conceptual diagram showing the state of code word mapping according to the invention.

FIG. 14 is a conceptual diagram showing a state of the code word mapping according to the invention. The mapping of each code word to multi-level modulation bits in this invention, as illustrated in FIG. 14, is different from the fixed mapping of FIG. 7 and the interleaving of FIG. 9. Thus, the feature is that each code word is unevenly mapped to each multi-level modulation bits. The mapping method of FIG. 14 is to assign the important x-bit of 64 QAM chiefly to the most significant bit {S5, S2} of 64 QAM at the time of decoding. In addition, the y'-bit is assigned chiefly to the least significant bit {S2, S0}. Here, the most significant bit has the highest resistance to error, and the least significant bit has the lowest resistance to error.

Figure 15:
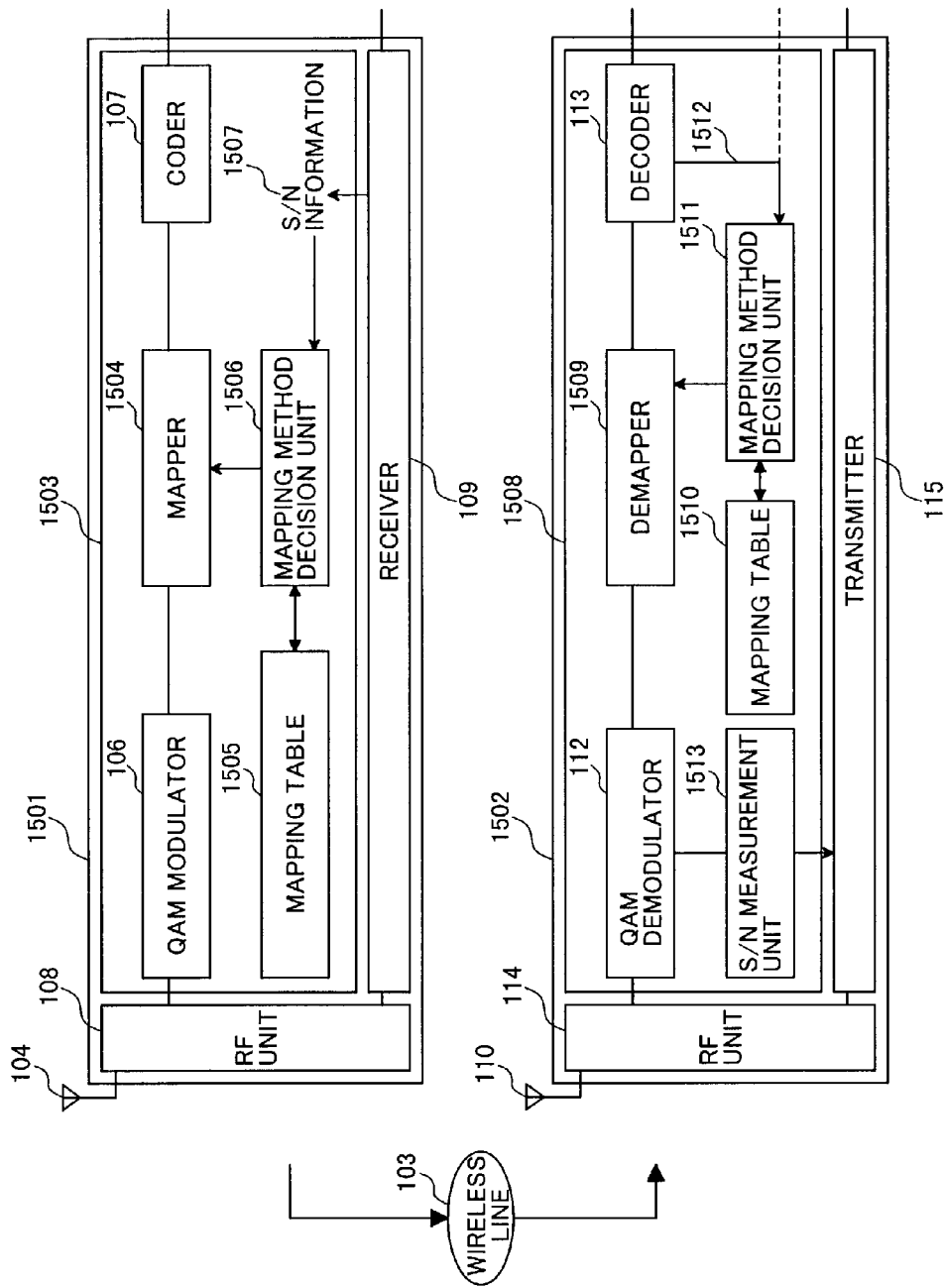
FIG. 15 is a block diagram of a radio communication system according to the invention.

FIG. 15 shows the construction of the radio communication system of this embodiment. In a transmission-side apparatus 1501, a receiver 1503 receives S/N information 1507 of the current radio propagation path, a mapper 1504 maps the code word from the coder 107 on the basis of S/N (1507) of the current radio propagation path and referring to the least error rate mapping method from a mapping table 1505, and the QAM modulator 106 makes QAM modulation after the mapping process. In a receiving-side apparatus 1502, the QAM demodulated data is demapped (1509) by using S/N information 1512 synchronized with the S/N information used in the transmission-side apparatus or identification, or ID information 1512 necessary for decision of mapping method, and a mapping table 1510 same as the mapping table used in the transmission-side apparatus, and then it is supplied to the decoder 113.

The S/N measurement method in the receiving-side apparatus and the S/N information acquisition method in the transmission-side apparatus will be described in detail in the tenth embodiment section.

The fourth embodiment of the invention will be described below.

This embodiment, which can be achieved by the same construction as that of the third embodiment, considers that the mapping pattern of code word is changed according to S/N. The mapping pattern for reducing the error rate to the minimum is changed at a different S/N as shown in FIG. 16. Therefore, there is the optimum mapping pattern according to the S/N of the current radio propagation path, and thus those optimum mapping patterns for different S/N ratios are switched so that communication can be always made at the minimum error rate even if the S/N ratio is any value.

The fifth embodiment of the invention will be described.

Figure 22:
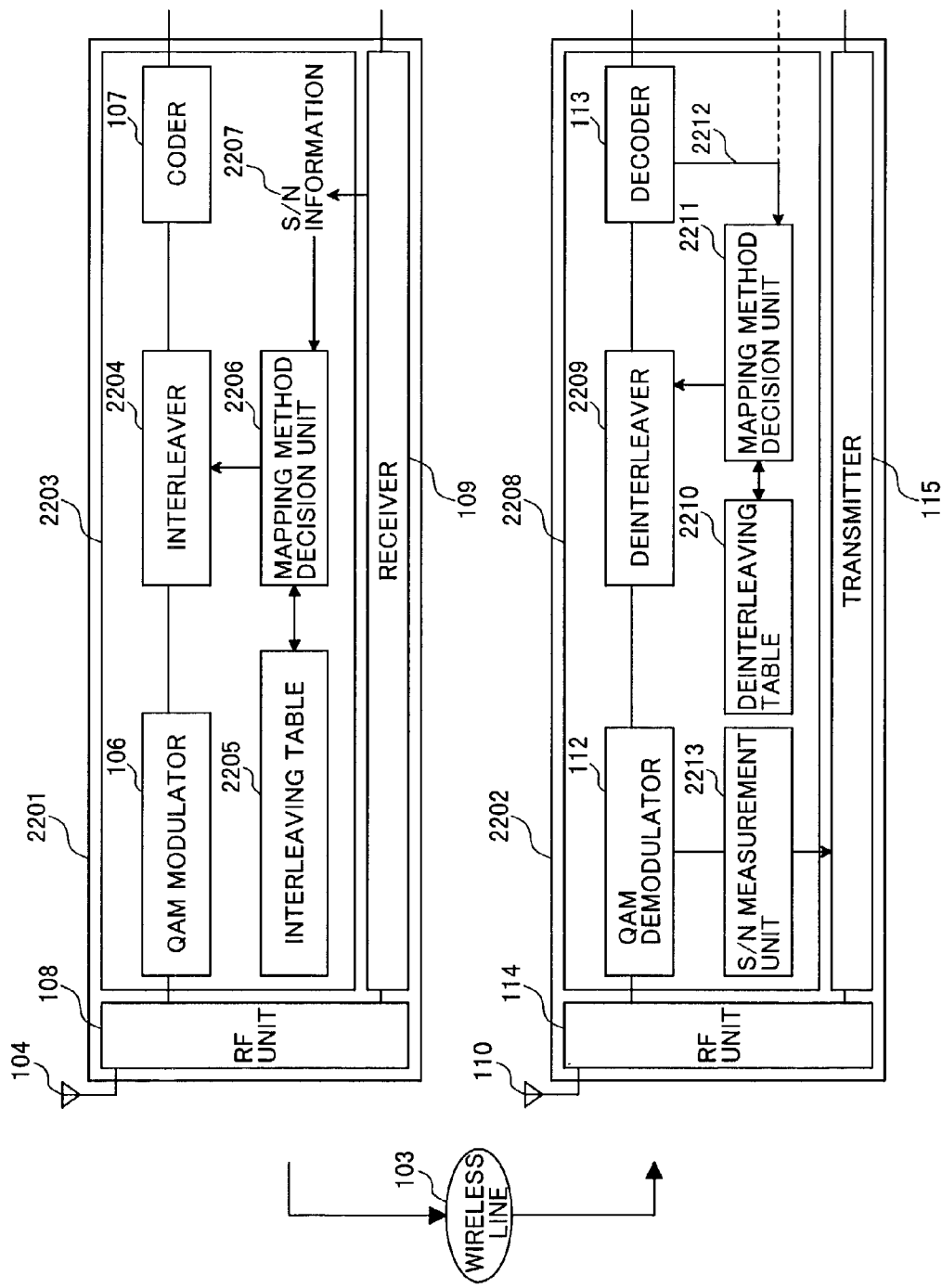
FIG. 22 is a block diagram of another radio communication system according to the invention.

This embodiment, in place of the mapping table and mapper that can achieve the minimum error rate in the third and fourth embodiments, previously provides an interleave pattern that can be changed according to S/N as another means that can attain the same effect, and achieves the object by the interleave process. FIG. 22 is a block diagram showing the construction of this system. Tables (2205, 2210) are provided to include interleave patterns in place of the mapping tables, and an interleaver 2204 and a deinterleaver 2209 are provided in place of the mapper. The other components are the same as in the previous embodiments.

The S/N measurement method in the receiving-side apparatus and the S/N information acquisition method in the transmission-side apparatus will be described later in the tenth embodiment section.

The sixth embodiment of the invention will be described.

This embodiment is associated with the code word mapping method in the third to fifth embodiments. In the sections of the third and fourth embodiments, the code word mapping rate for the minimum error rate is estimated by computer simulation, and used to provide a table, but the case when the error rate becomes the minimum is not mentioned.

Figure 1:
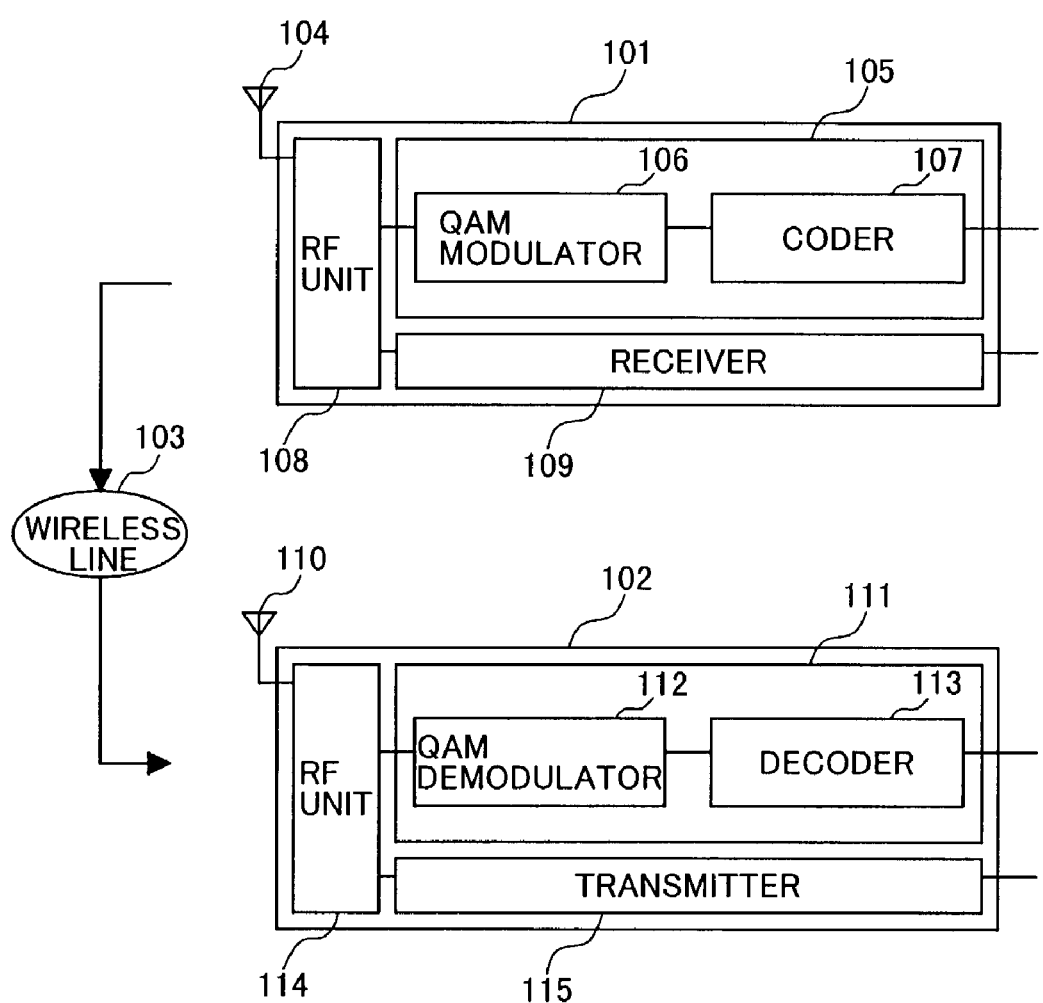
FIG. 1 is a block diagram showing the construction of a conventional radio communication system.
Figure 2:
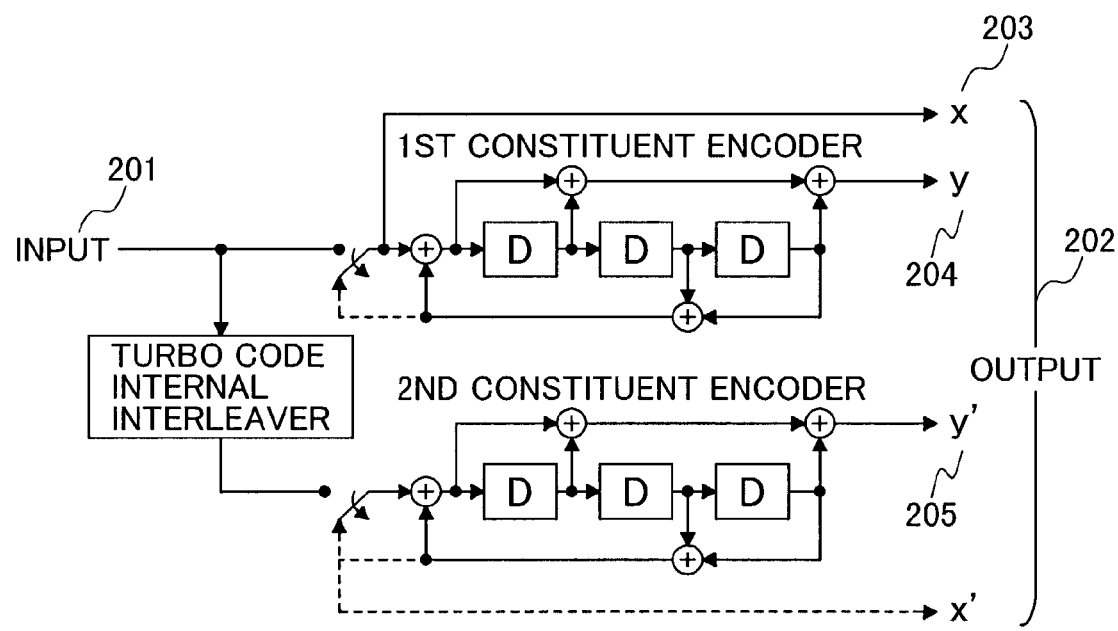
FIG. 2 is a block diagram showing the construction of a turbo coder.
Figure 3:
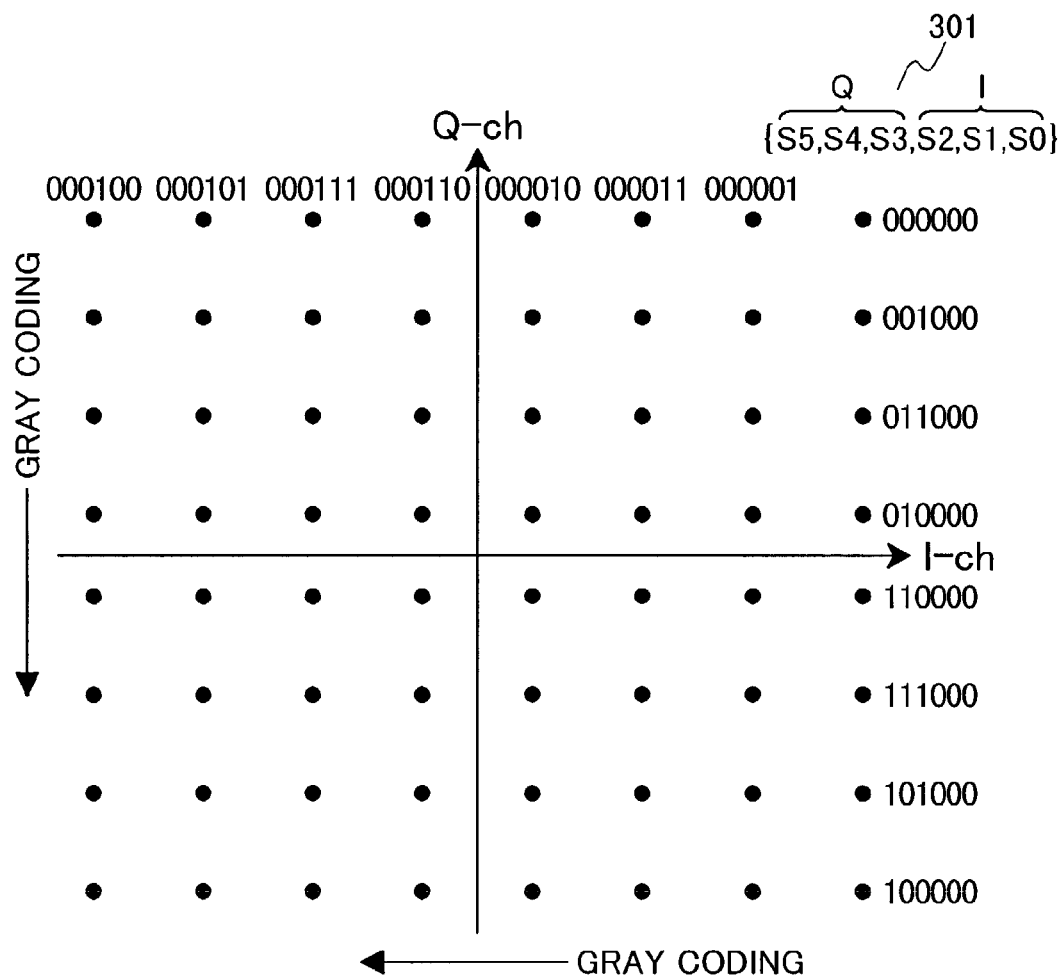
FIG. 3 is a conceptual diagram showing the arrangement of signal points of multi-level modulation (for 64 QAM).
Figure 4:
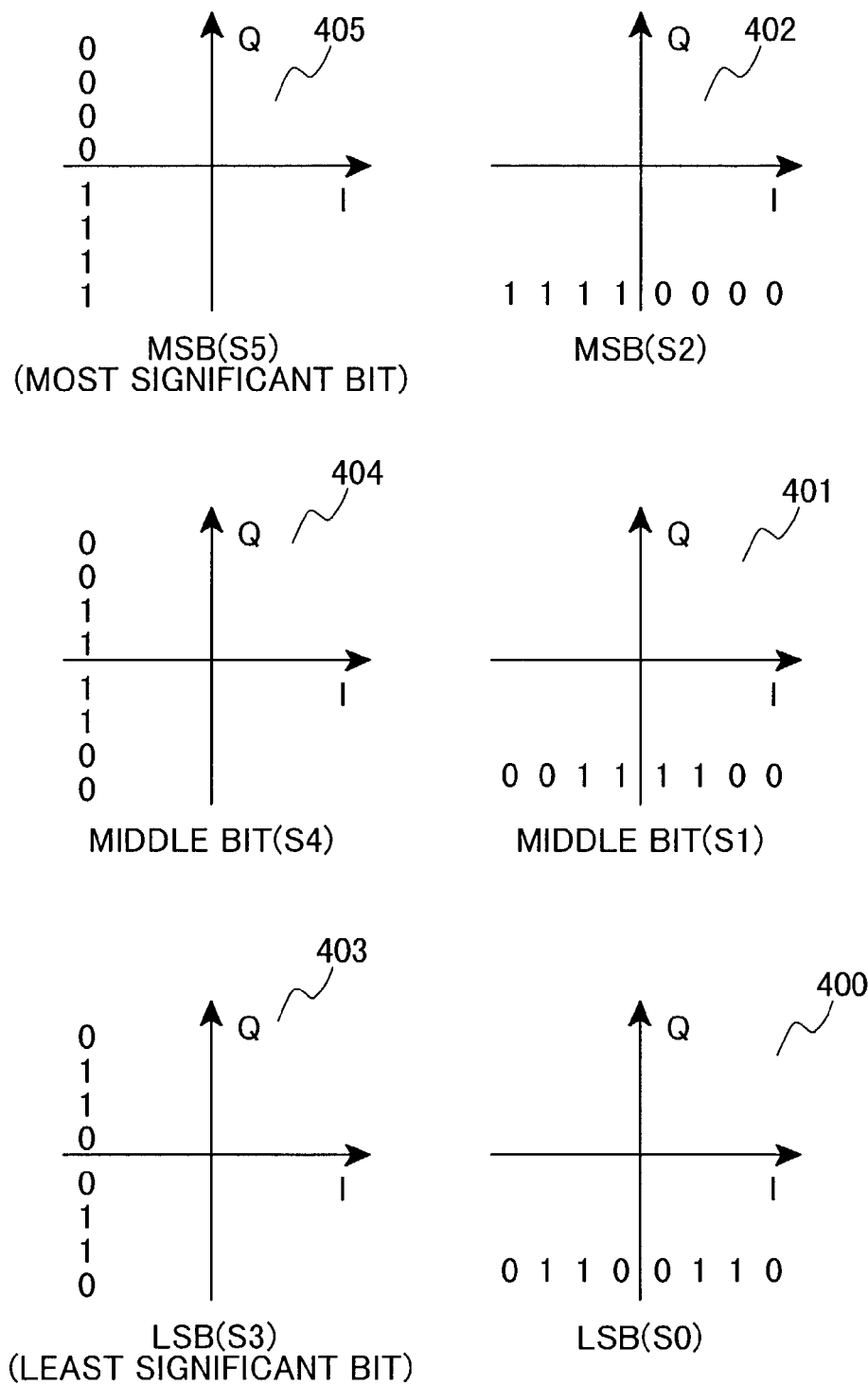
FIG. 4 is a conceptual diagram showing a bit decision method used at the time of demodulation of 64 QAM.

The code word mapping method of this embodiment is characterized in that in a low S/N region the level of importance of each code word for decoding and the resistance of each bit of QAM to error are considered so that code words having a high level of importance for decoding can be assigned to bits of QAM having strong resistance to error. Since the noncoded x-bit 203 of turbo code shown in FIG. 2 is the most important code word, this bit is assigned to the most significant bit {S5, S2} of QAM. The low S/N region (S/N=7.0 dB) shown in FIG. 16 just coincides with this idea.

In a high S/N region, the mapping method is characterized in that each code word is substantially equally assigned to each bits of QAM so as to reduce the resistance-to-error difference of each bit of QAM, and to give each code word substantially equal quality. The high S/N region (S/N=8.0 dB) shown in FIG. 16 just coincides with this idea.

The seventh embodiment of the invention will be described next. FIG. 19 shows the code word mapping of this embodiment. In this embodiment, the third to sixth embodiments are further expanded so that the energy of code word is most suitably allocated in accordance with the level of importance of each code word before each code word is assigned to bits of QAM by mapping. As, for example, shown in FIG. 19, when the x-bit is the highest in the level of importance of each code word for decoding, and followed by y-bit and then y'-bit in this order, energy allocation or power allocation (1902) is made by code word repetition so that the amount of information of each code word being transmitted can be coincident with its level of importance, and after this allocation each code word is mapped to QAM bits. In this case, since the bit number of each code word is different, the mapping rate at which the error rate becomes the minimum is different from that of the mapping pattern in the third to fifth embodiments. Although the energy allocation or power allocation is changed here by code word repetition, another method may be used to make the allocation.

In addition, since the levels of importance of each code word bits (x, y, y') for decoding are all different, the repetition rates of each code word bits are also different. Here, the repetition rate is defined as (bit number after repetition process)/(bit number before repetition process). At least in the case of turbo code shown in FIG. 2, this embodiment is characterized in that the repetition rate of x-bit is the highest, and the repetition rates of y-bit and y'-bit are different from that. The error rate characteristic can be further improved by this allocation.

The eighth embodiment of the invention will be described below.

The seventh embodiment is further expanded so that after repetition of code word, the optimum mapping patterns for multi-level modulation bits are calculated (1906, 1907, 1908) that minimize the error rate in accordance with the resistance of each bit to noise.

Figure 18:
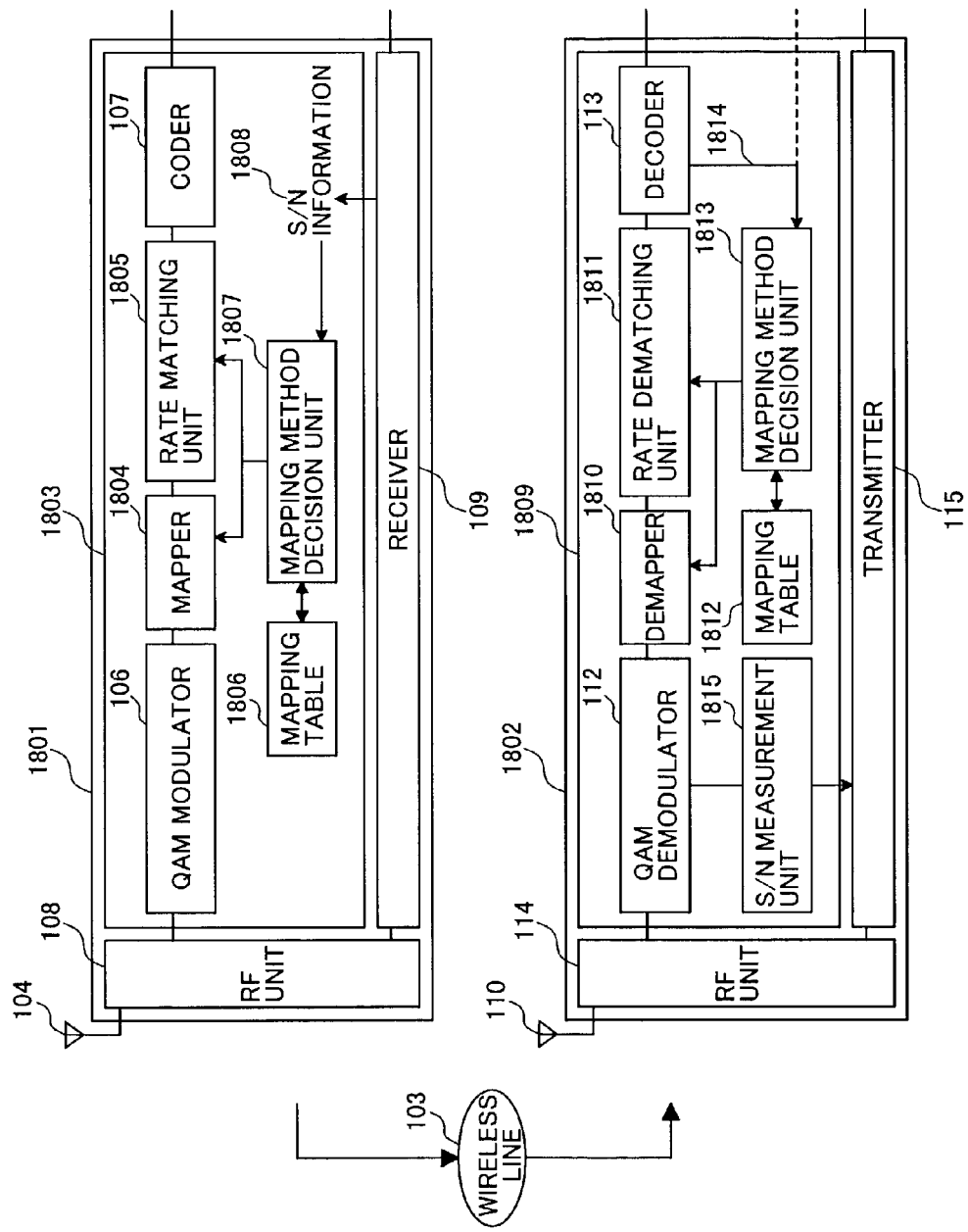
FIG. 18 is a block diagram of a radio communication system according to the invention.
Figure 20:
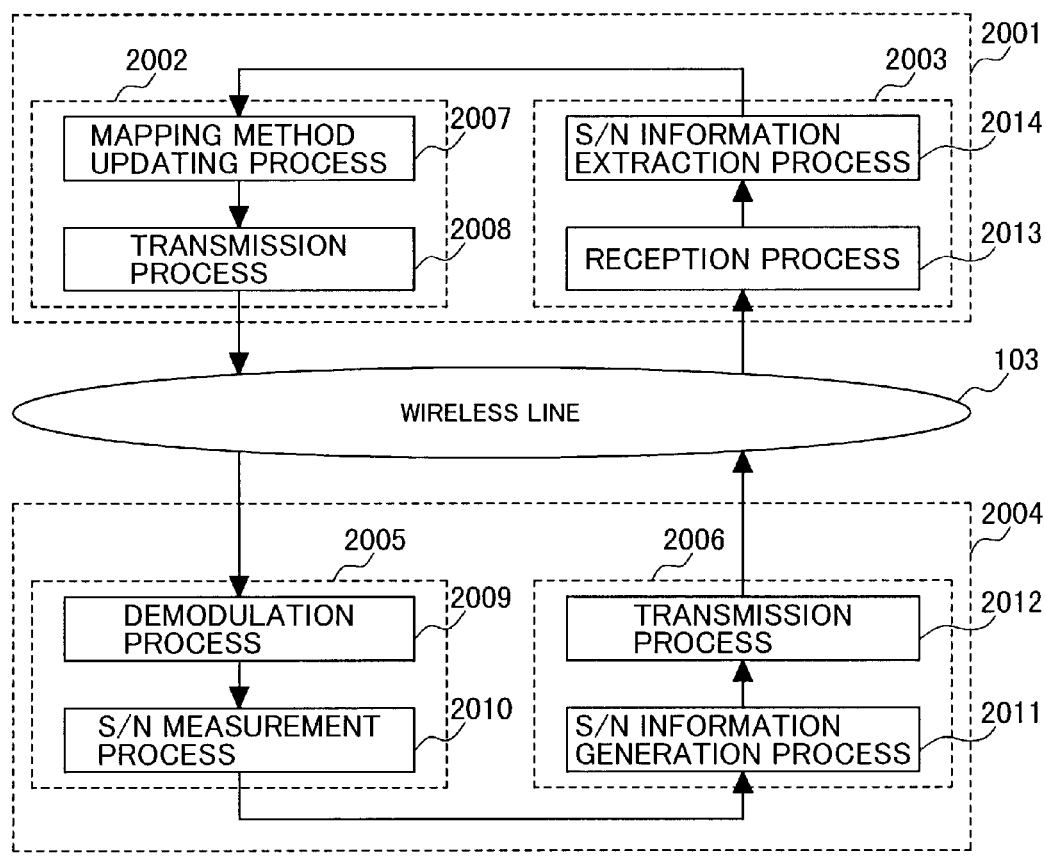
FIG. 20 is a block diagram showing the flow of information for updating the code word mapping.

FIG. 18 is a block diagram showing the construction of the radio communication system of this embodiment. In a transmission-side radio communication apparatus 1801 of FIG. 18, a rate matching unit 1805 makes repetition and extraction (puncture) of code word bits while referring to a mapping table 1806 that minimizes the error rate in accordance with the S/N of the current radio propagation path, and the QAM modulator makes QAM modulation after the process in a mapper 1804 based on that mapping table 1806. In a receiving-side apparatus 1802, a demapper 1810 demaps the QAM-demodulated data of the mapped data sent from the transmission-side apparatus, and a rate dematching unit 1811 removes code word bits repeated at the time of transmission, and fills after the extraction to restore the number of code word bits to the original number. Then, the decoder 113 decodes the data from the rate dematching unit.

The S/N measurement method in the receiving-side apparatus and the S/N information acquisition method in the transmission-side apparatus will be described in detail later in the tenth embodiment section.

The ninth embodiment of the invention will be described.

This embodiment is characterized in that Shannon's water-pouring theorem is used when the rates of mapping optimum code word to multi-level modulation bits are calculated in the code word mapping method described in the sections of the third to eighth embodiments.

The tenth embodiment of the invention will be described.

In all embodiments mentioned so far, the code word mapping method is changed by switching in accordance with the S/N in the radio propagation path. In the section of this embodiment, a description will be made of the measurement of the S/N in the radio propagation path and the reflection of this measurement to the change of code word mapping in the transmission-side apparatus. FIG. 21 shows a flow of information for the change of code word mapping. The signal to be transmitted by a transmitter 2002 of a transmission-side apparatus 2001 is received through the radio propagation path 103 by a receiver 2005 of a receiving-side apparatus 2004. The received signal is demodulated (2009), and the S/N (ratio of signal power to noise power) of the received signal is measure by using this demodulated signal (2010). A well known method of measuring the S/N is to calculate from the average and dispersion of the received signal.

When communication is made between the transmission-side apparatus 2001 and the receiving-side apparatus 2004, two channels are generally used of the communication channel for signal to be sent from the transmission-side apparatus to the receiving-side apparatus (for the sake of convenience, called downlink), and the channel for signal to be sent from the receiving-side apparatus to the transmission-side apparatus (for the sake of convenience, called uplink). The reason for use of two channels is that the uplink is necessary to use for controlling the flow of data transmitted on the downlink, and the transmission power of the downlink.

Thus, the S/N information measured previously within the receiver 2005 of the receiving-side apparatus 2004 is transmitted through the uplink to the transmission-side apparatus 2001. Here, the S/N information may be the measured S/N itself, a difference to a certain reference S/N or information for indicating whether the measured S/N is higher or lower than a certain reference S/N.

Then, the S/N information to be transmitted is generated on the basis of the S/N measured by an S/N information generation process 2011 within a transmitter 2006 of the receiving-side apparatus 2004. This information is transmitted from the transmitter 2006 of the receiving-side apparatus 2004, and received through the radio propagation path 103 by the receiver 2003 of the transmission-side apparatus 2001. The receiver 2003 of the transmission-side apparatus 2001 demodulates this received signal and then extracts S/N information (2003). The transmission-side apparatus decides whether the mapping method is updated on the basis of the extracted S/N information (2007), and continues to make communication by using an optimum code word mapping method.

Thus, the S/N of the downlink is transmitted through the uplink to the transmission-side apparatus, so that a closed loop control system for any time updating can be formed. Accordingly, the optimum code word mapping method can be switched to in accordance with the S/N of the propagation path.

The eleventh embodiment of the invention will be described below.

This embodiment is related to a method for the receiving-side apparatus to identify the cord word mapping method used in current communication, and to previously provide a code word mapping pattern on the receiving side.

In all the embodiments mentioned so far, the transmission-side apparatus and the receiving-side apparatus are required to make the mapping and demapping processes by using the same code word mapping pattern. The transmission-side apparatus selects the optimum code word mapping pattern by switching according to the S/N of the propagation path as described in the tenth embodiment section.

Thus, as means for the receiving-side apparatus to know the switched mapping pattern, information of the currently used mapping pattern is included in the information to be transmitted from the transmission-side apparatus to the receiving-side apparatus. Specifically, since the channel coding is generally made for each coding unit, identification information indicative of a code word mapping method is added at every coding units to the transmission signal.

Figure 23:
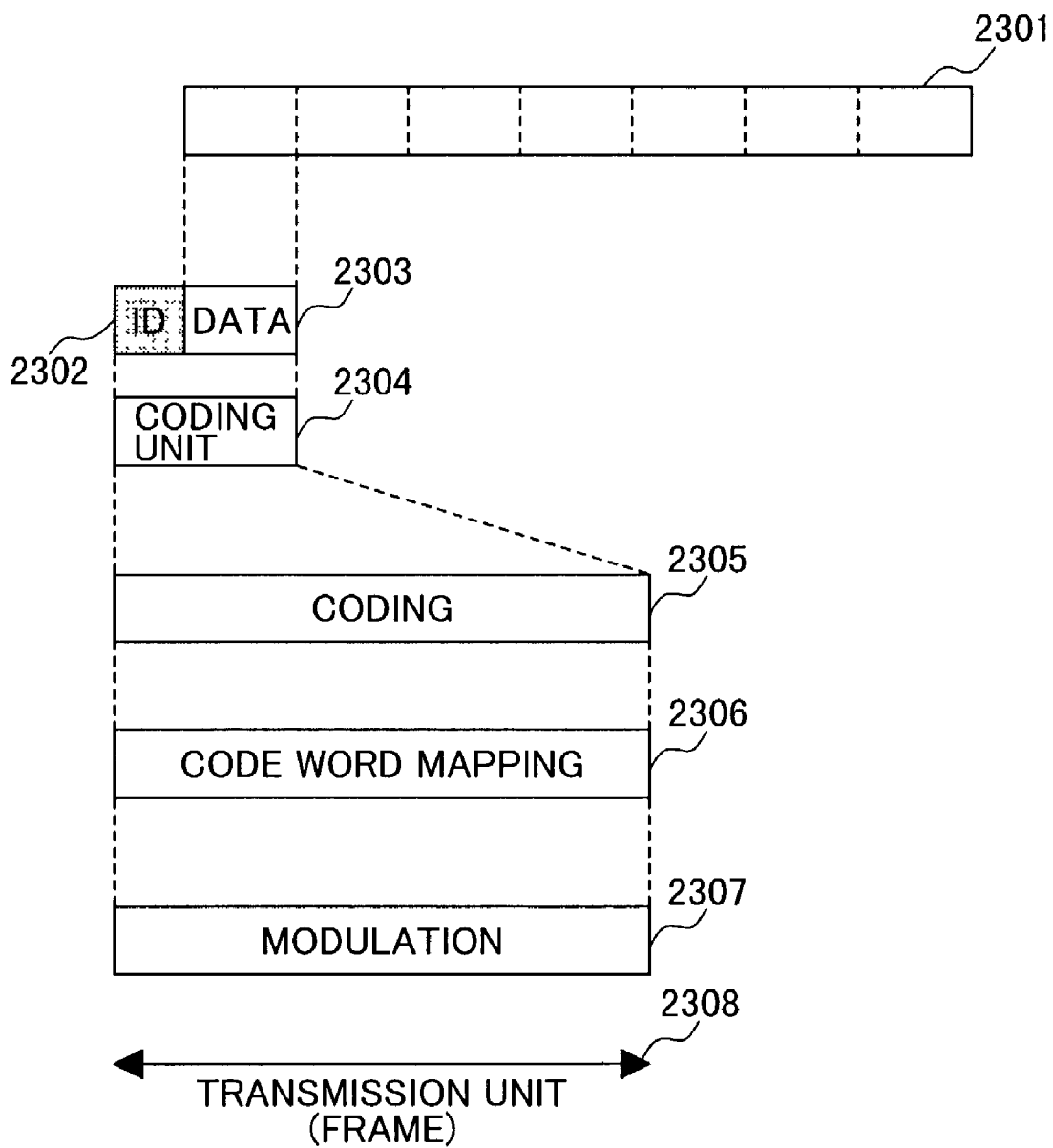
FIG. 23 is a diagram showing a formatting method of embedding mapping pattern ID information.
Figure 24:
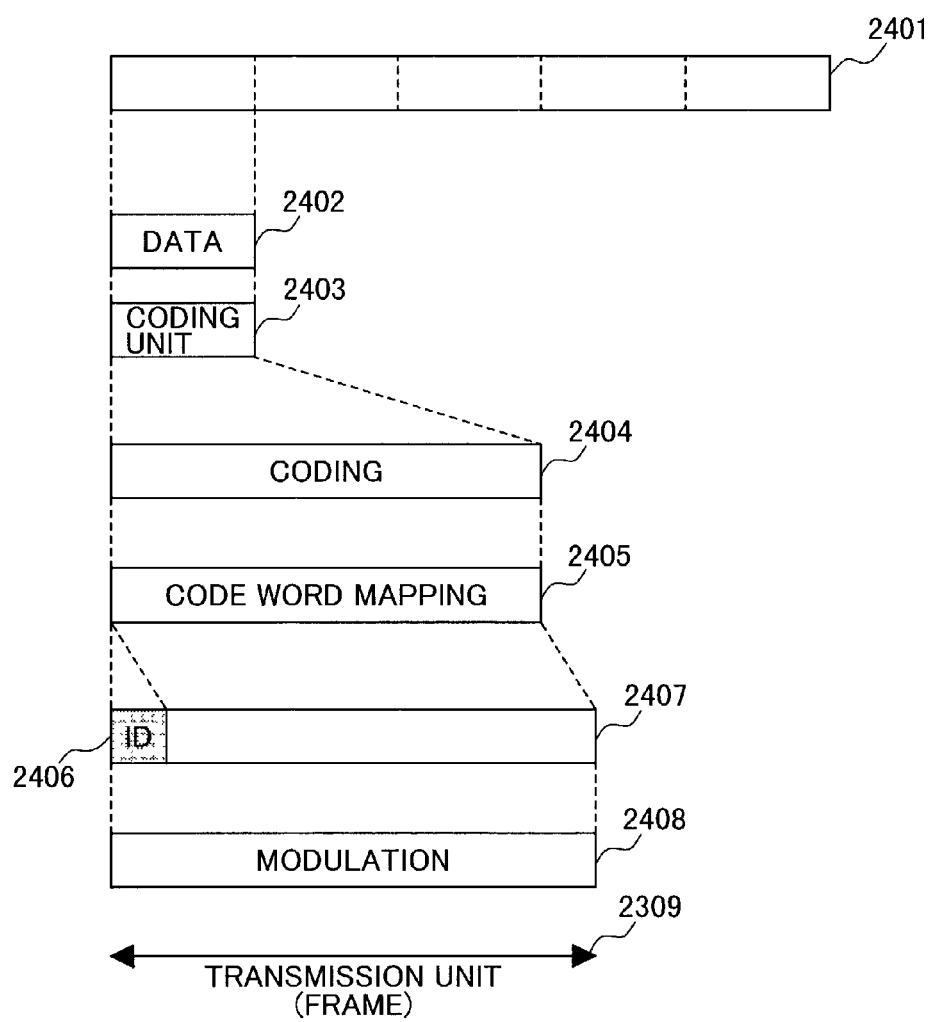
FIG. 24 is a diagram showing a formatting method of embedding mapping patter ID information.

The identification information, or ID information may be an identifier by which any one of the mapping patterns that each of the transmission-side apparatus and receiving-side apparatus has can be uniquely identified. FIG. 23 shows an example of a method for embedding the mapping pattern identification information. The ID information is added to the transmission signal as illustrated in FIG. 23. That is, the transmission-side apparatus previously embeds a mapping pattern identifier 2302 to be used for the next transmission signal into information data 2301 to be transmitted, and it encodes and transmits the identifier-embedded data as a coding unit 2304. The receiving-side apparatus, after decoding the received data, separates the identifier from the decoded data, and supplies it to the mapping method decision unit of the receiver so that a mapping pattern can be set on the receiving side. FIG. 24 shows another example the method for embedding the mapping pattern ID information. As illustrated in FIG. 24, like the power control bit regularly inserted in a time-sharing manner by W-CDMA system, the transmission-side apparatus inserts ID information 2406 in a time-sharing manner into data after the code word code-unit mapping process 2405 to be transmitted, and the receiving-side apparatus demodulates the received data to thereby acquire the mapping pattern identifier 2406 to be used for the next transmission signal, and supplies it to the mapping method decision unit of the receiver.

By these methods, it is possible for the receiving-side apparatus to previously know which mapping method is used to map the next transmission signal, and to make communication by setting the mapping pattern.

The twelfth embodiment of the invention will be described.

This embodiment is concerned with the switching frequency of the code word mapping methods in the first to eleventh embodiments. The information data to be transmitted in a cellular phone system such as W-CDMA is divided into coding units of a finite length, and transmitted in frame units of 10 ms each. The switching frequency in this invention is also the frequency of switching transmission units in synchronism with this unit (frame) as shown in FIGS. 23 and 24. Since the code word mapping pattern is updated with a short period of about 10 ms, communication can be made always at the minimum error rate according to the S/N of the propagation path.

The thirteenth embodiment of the invention will be described below.

In this embodiment, the transmission-side apparatus and receiving-side apparatus described so far in the sections of the first to twelfth embodiments are applied to the base-station apparatus and mobile terminal of the cellular phone system, respectively. The cellular phone system also employs turbo encoding as channel coding. The modulation system is generally QPSK, but demand for fast data transmission has been increased. It can be highly expected to employ, for transmission of data, a combination of channel coding and multi-level modulation mentioned at the sections of the first to twelfth embodiments. In that case, this invention can be used in the cellular phone system. In addition, since the cellular phone system using CDMA system such as W-CDMA employs closed-loop transmission power control to maintain S/N constant, the number of optimum mapping tables provided in accordance with S/N can be decreased. By using the code word mapping method of the invention, it is possible to reduce the necessary S/N as compared with the prior art, and thus to decrease the amount of interference over the whole system so that the number of members can be increased.

The fourteenth embodiment of the invention will be described next.

In this embodiment, the transmission-side apparatus and receiving-side apparatus described so far in the sections of the first to twelfth embodiments are applied to the access point and access terminal of the radio LAN system. Since the radio LAN system also employs the channel encoding and modulation for transmission and reception of data, the code word mapper can be inserted between the coder and modulator. Since the necessary S/N can be reduced in this invention as compared with the prior art, the amount of interference over the whole system can be decreased, thus the invention contributing to the increase of throughput.

Since the code word mapping method of the invention considers the level of importance for decoding of each code word and the resistance of each of multi-level modulated bits to error due to noise so that the error rate can be minimized according to S/N, satisfactory error rate characteristic can be achieved for all S/N values as compared with that of the prior art, and transmission power necessary for achieving a desired error rate can be reduced.

Since the code word mapping method of the invention considers the level of importance of each code word bits for decoding and the resistance of each of multi-level modulated bits to error due to noise in order to assign code word bits of a high level of importance for decoding to multi-level modulated bits that have high resistance to error, satisfactory error rate characteristic can be achieved even in a low S/N region as compared with that of the prior art.

<1> A communication method using a multi-level modulation system, having the steps of, on a transmission side,
coding M-bit data to N-bit data (where M≦N),
converting the N-bit data to symbols of a plurality of bits each, thereby making multi-level modulation, and on a receiving side,
converting the symbols to the N-bit data, thus demodulating,
decoding the demodulated N-bit data to the M-bit data, wherein
each bit of the N-bit data is weighted, each of the symbols has a different resistance to error, and
the conversion between the N-bit data and the symbols on the transmission side and receiving side is made by using a conversion rule in which when a bit A of the N-bit data is decided to be assigned to symbol α, and another bit B to symbol β, then the bit having a larger weight is assigned to a symbol having higher resistance to error.

<2> A communication method according to method <1>, wherein the conversion between the N-bit data and the symbols on the transmission side and receiving side is made for all bits of the N-bit data but not for only bits A and B by using a conversion rule in which bits having larger weights are assigned to symbols having higher resistance to error.

<3> A communication method according to method <1>, wherein the conversion rule is provided as mapping tables that correspond to the quality values of the propagation path between the transmission side and receiving side, and switched according to the quality of the propagation path.

<4> A communication method according to method <3>, wherein the conversion between the N-bit data and the symbols on the basis of the mapping tables is achieved as interleave patterns of finite length by using an interleaver on the transmission side and a deinterleaver on the receiving side.

<5> A communication method according to method <3>, wherein when the quality of the propagation path between the transmission side and the receiving side is equal to or less than a certain value, the rule is used, and when the quality is larger than the value, the respective bits of the N-bit data are equally or randomly assigned to symbols of the range from high resistance to low resistance to error.

<6> A communication method according to method <3>, wherein water-pouring theorem is used for generating the mapping tables.

<7> A communication system using a multi-level modulation system, of which the transmission-side communication apparatus includes:
a coder for converting M-bit data to N-bit data (where M≦N);
a multi-level modulator for converting the N-bit data to symbols of a multi-level each; and
a mapping method decision unit for controlling a conversion rule (mapping) between each bit of the N-bit data and symbol in the multi-level modulator, the conversion rule being controlled in such a manner that each bit of the N-bit data is not equally or randomly assigned to symbol, but assigned after being weighted according to the resistance of each symbol to error.

<8> A communication system according to system <7>, wherein a rate matching unit is provided between the coder and the multi-level modulator to make repetition and puncture of code word so that the operation for repetition and puncture of code word is made at a different repetition rate (bit number after repetition/bit number before repetition) according to the level of importance for decoding of the code word produced from the coder.

<9> A communication system using a multi-level modulation system, of which the receiving-side communication apparatus includes:
a demodulator for demodulating the received symbols of a multi-level each into the N-bit data;
a decoder for converting the N-bit data to the M-bit data (where M≦N); and
a mapping method decision unit for controlling a conversion rule for conversion between each bit of the N-bit data and the symbols in the demodulator on the basis of the mapping rule set on the transmission side.

<10> A communication system according to system <9>, wherein ID information for identifying the mapping rule is previously received before the symbols are received, and mapping tables are provided according to the ID information.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication method using a multi-level modulation system comprising the steps of:
on a transmission side,
coding M-bit data into N-bit data (where M≦N);
determining, for every N-bit data, whether or not to interleave said N-bit data, based on a transmission condition in a propagation path between said transmission side and a receiving side; and modulating said N-bit data into symbols of a plurality of bits each, and transmitting said symbols; and on said receiving side, demodulating said received symbols into said N-bit data;

selectively rearranging (deinterleaving) said demodulated N-bit data; and decoding said N-bit data into said M-bit data, wherein each bit of the N-bit data has a determined level of importance at the time of decoding and each symbol has a different resistance to error, wherein when communication is made between the N-bit data and the symbols on the transmission side and the receiving side and when the quality of the propagation path between the transmission side and the receiving side is equal to or less than a certain value, a rule is applied such that large-weight bits are assigned to symbols of high resistance to error, and wherein when communication is made between the N-bit data and the symbols on the transmission side and the receiving side and when the quality of the propagation path is larger than the certain value, the respective bits of the N-bit data are equally or randomly assigned to symbols of the range from high resistance to low resistance to error.

2. A communication method according to claim 1, wherein when said transmission condition in said propagation path between said transmission side and said receiving side is lower than a certain reference value, said transmission side does not make interleaving and said receiving side does not make deinterleaving, and when said transmission condition is higher than said reference value, said transmission side makes interleaving and said receiving side makes deinterleaving.

3. A communication method according to claim 2, wherein when said transmission condition changes within a certain range, the presence or absence of interleaving operation is not selected.

4. A transmission-side communication apparatus in a radio communication system using a multi-level modulation system, comprising:

a coder for converting M-bit data into N-bit data (where M≦N);

an interleaver for rearranging (interleaving) said N-bit data produced from said coder;

a multi-level modulator for converting said N-bit data into symbols of a multi-level; and a controller for determining, for every N-bit data, whether or not to interleave said N-bit data, based on a transmission condition in a propagation path wherein each bit of the N-bit data has a determined level of importance at the time of decoding and each symbol has a different resistance to error, wherein when communication is made between the N-bit data and the symbols on the transmission side and the receiving side and when the quality of the propagation path between the transmission side and the receiving side is equal to or less than a certain value, a rule is applied such that large-weight bits are assigned to symbols of high resistance to error, and wherein when communication is made between the N-bit data and the symbols on the transmission side and the receiving side and when the quality of the propagation path is larger than the certain value, the respective bits of the N-bit data are equally or randomly assigned to symbols of the range from high resistance to low resistance to error.

5. A receiving-side communication apparatus in a radio communication system having a multi-level modulation system, comprising:

a demodulator for demodulating received symbols of a multi-level each into N-bit data;

a deinterleaver for rearranging (deinterleaving) said N-bit data;

a decoder for converting said N-bit data into M-bit data (where M≦N); and a controller for determining, for every N-bit data, whether or not to deinterleave said N-bit data, based on a transmission condition in a propagation paths, wherein each bit of the N-bit data has a determined level of importance at the time of decoding and each symbol has a different resistance to error, wherein when communication is made between the N-bit data and the symbols on the transmission side and the receiving side and when the quality of the propagation path between the transmission side and the receiving side is equal to or less than a certain value, a rule is applied such that large-weight bits are assigned to symbols of high resistance to error, and wherein when communication is made between the N-bit data and the symbols on the transmission side and the receiving side and when the quality of the propagation path is larger than the certain value, the respective bits of the N-bit data are equally or randomly assigned to symbols of the range from high resistance to low resistance to error.

6. A communication method using a multi-level modulation system comprising the steps of:

on a transmission side, coding M-bit data into N-bit data (where M≦N);

interleaving said N-bit data and changing a rule of said interleaving, wherein the rule is changed based on a transmission condition in a propagation path between said transmission side and a receiving side; and modulating said N-bit data into symbols of a plurality of bits each, and transmitting said symbols; and on said receiving side, demodulating said received symbols into said N-bit data;

selectively rearranging (deinterleaving) said demodulated N-bit data; and decoding said N-bit data into said M-bit data;

wherein each bit of the N-bit data has a determined level of importance at the time of decoding and each symbol has a different resistance to error, wherein when communication is made between the N-bit data and the symbols on the transmission side and the receiving side and when the quality of the propagation oath between the transmission side and the receiving side is equal to or less than a certain value, a rule is applied such that large-weight bits are assigned to symbols of high resistance to error, and wherein when communication is made between the N-bit data and the symbols on the transmission side and the receiving side and when the quality of the propagation path is larger than the certain value, the respective bits of the N-bit data are equally or randomly assigned to symbols of the range from high resistance to low resistance to error.

* * * * *